US008180690B2

(12) United States Patent
Mayle et al.

(10) Patent No.: US 8,180,690 B2
(45) Date of Patent: May 15, 2012

(54) SYSTEM AND METHOD FOR INTERACTING WITH ITEM CATALOGS

(75) Inventors: Neil Mayle, Cambridge, MA (US);
Oliver Steele, Amherst, MA (US);
David L. Rose, Cambridge, MA (US)

(73) Assignee: Dotted Pair, Inc., Cambridge, MA (US)

( * ) Notice: Subject to any disclaimer, the term of this patent is extended or adjusted under 35 U.S.C. 154(b) by 1140 days.

(21) Appl. No.: 11/931,974

(22) Filed: Oct. 31, 2007

(65) Prior Publication Data

US 2008/0109327 A1 May 8, 2008

Related U.S. Application Data

(60) Provisional application No. 60/855,946, filed on Oct. 31, 2006.

(51) Int. Cl.
*G06Q 30/00* (2012.01)
(52) U.S. Cl. .................................................. 705/27.1
(58) Field of Classification Search .................. 705/26, 705/27, 27.1, 26.1
See application file for complete search history.

(56) References Cited

U.S. PATENT DOCUMENTS

| 5,890,175 A | 3/1999 | Wong et al. |
| 2002/0055891 A1 | 5/2002 | Yang |
| 2004/0059645 A1 | 3/2004 | Wirth, Jr. |
| 2004/0113945 A1 | 6/2004 | Park et al. |
| 2006/0106682 A1 | 5/2006 | Van Dyck et al. |
| 2007/0008621 A1 * | 1/2007 | Satoh et al. .................. 359/465 |

OTHER PUBLICATIONS

O'Reilly & Associates: Techies and non-techies alike can build dynamic web sites with ease; O'Reilly releases "Learning PHP 5," Aug. 5, 2004, M2 Presswire, p. 1.*

* cited by examiner

*Primary Examiner* — Jeffrey A Smith
*Assistant Examiner* — Brandy A Zukanovich
(74) *Attorney, Agent, or Firm* — Steven M. Jensen; Edwards Wildman Palmer LLP

(57) ABSTRACT

The present invention comprises a system and method for presenting large numbers of items on a display screen. According to one aspect of the present invention, information is harvested from a plurality of sites and over a plurality of times and aggregated into a single item set. According to another aspect of the present invention, this information is supplemented by data derived from sorting and classification tasks performed by humans. According to another aspect of present invention, this information is used to derive similarities between items and to derive a hierarchical classification of items into a hierarchical set of categories. According to another aspect of the present invention, one or more series of catalog displays are created which display these items arranged by different criteria and at different scales.

26 Claims, 26 Drawing Sheets

Catalog Layout Process

Client/Server Architecture

Exemplary Block Diagram of Computer Device

System Overview: Server

Catalog Construction and Catalog Update Process

Item Comparison Process

Catalog Layout Process

Image Creation Process

Dataset Creation Process

Image Slicing

Optimized Update Process

Display levels

Level-specific datasets

Area-specific datasets

Image Comparison Step

Frontier Data Structure

Region Data Structure

Category Layout Algorithm, pt. 1

Category's children and their extents
1410

Sorted children
1420

Positioning the first child:

Initial region
1430

Remaining children

Positioning the second child:

Candidate positions
1440

Selected position
1450

New region
1460

Category Layout Algorithm, pt. 2

View Structure

Pan

Search Results Highlight Mask

1800 Items in viewport

1840 Mask region

1850 Mask rectangles

1860 Mask image

1870 Mask rectangles and images composed over level display image

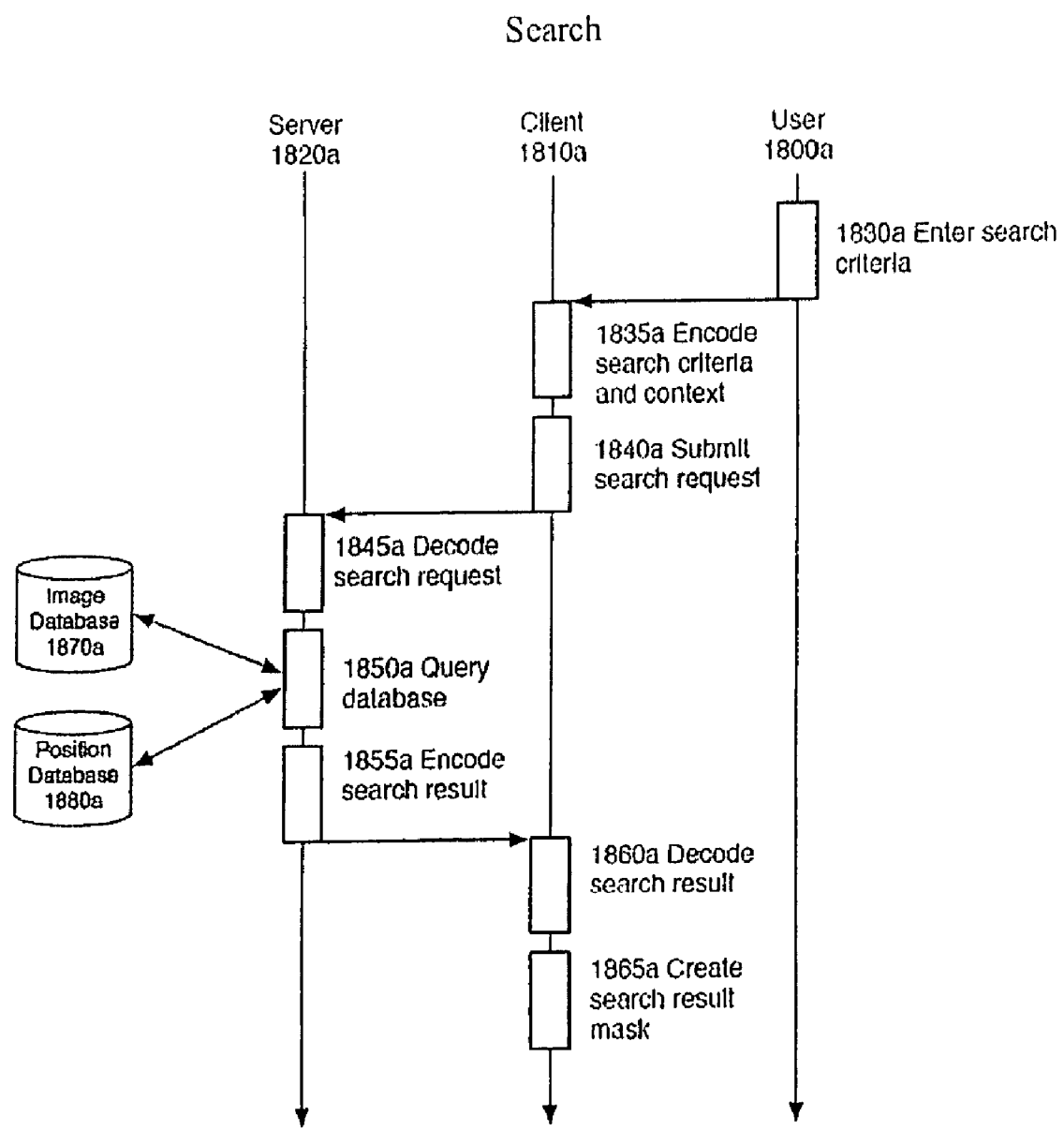

Icon Image Selection Process

Widgets

Catalog Display

Category Labels and Icons

Brand Labels and Isolines

SYSTEM AND METHOD FOR INTERACTING WITH ITEM CATALOGS

CROSS-REFERENCE TO RELATED APPLICATION

This application claims priority to U.S. Provisional Patent Application Ser. No. 60/855,946, filed on Oct. 31, 2006.

TECHNICAL FIELD

The invention relates generally to display systems and more particularly to graphical zooming user interfaces for computers. The invention further relates to information presentation and management in the field of online commerce, such as an online shopping site, an online auctioning site, an online e-commerce site, an online person-to-person trading site, or the like.

BACKGROUND INFORMATION

One problem encountered by online merchants is the ability to present large numbers (thousands, tens of thousands, or millions) of products. A typical online interface, such as that used by Amazon, eBay, or Yahoo Shopping, requires the user to page through large numbers of distinct web pages in order to browse the products in an online product catalog. This process is slow, frustrating, and fails to leverage the visual and spatial cognitive abilities of the user.

There are thousands of online stores. Many of these stores have large catalogs of products. Using most store websites it is very time consuming for a shopper to view more than a few dozen products. This is unlike physical stores where a shopper can walk through a department or scan through a rack in a few minutes and see many items. It is also unlike catalog shopping where a shopper can flip through the pages very quickly and in a small number of minutes see most of the offerings of a store.

Each online merchant has created a catalog of products. The larger merchants have created catalogs that contain thousands to millions of products. The products are presented to the shopper on web pages. The products are usually organized into pages by category and/or brand. For each page the store presents images and information about a small number of products (typically twelve to 24). To see more items, the shopper clicks a button on the web page and gets another page with the same number of products. To see a large number of products can take dozens of page loads and a significant amount of time.

Spatial layout of images has been used in the interfaces for viewing the set of files on an operating system. In the Macintosh Finder and the Windows Explorer, computer system files are manipulated as icons using a "desktop metaphor": a computer system file is presented at a particular location in a two-dimensional space, the way that physical files are placed at a spot on a physical desk. While computer system files don't have an intrinsic spatial location, the icons that represent them do. Similarly, although products in an online catalog do not a have a physical position, the images for these products can be arranged in two dimensions.

When an image or arrangement of images is larger than the computer screen some technique must be used to allow the user to select which parts of the image to view. Scroll bars are one approach that has been used by many software programs. Scroll bars work well for viewing documents, but other techniques have been developed for viewing graphical representations. A pan gesture with the mouse is often a more convenient way to change the region of an image being viewed. The pan gesture has been used in Computer Aided Design (CAD) programs for many years, to view diagrams of circuits, buildings and mechanical systems.

CAD programs also have gestures for zooming in and out on the diagram. These gestures cause the display to be scaled, causing the presentation of the objects being displayed to become smaller or larger.

Until Dynamic HTML was introduced and supported by most browsers, when a user interacted with a web page, the only way for the page to react to a user gesture and significantly change what was displayed was to reload the whole web page. That action would take a second or more and was visually disruptive. Using Dynamic HTML combined with client scripting via Javascript, a web page can react to user gestures, load small amounts of information from the server and update portions of the web page. This interactivity makes it possible to smoothly pan and zoom in a browser through a two-dimensional display.

SUMMARY OF THE INVENTION

The present invention addresses these and other problems by providing an interface that makes it possible to quickly and easily browse product catalogs containing large numbers of products. This interface uses the capabilities of Dynamic HTML and ideas from file system browsers and Computer Aided Design.

Thus, it is a goal of the present invention to provide an interface to a catalog of items that allows easy browsing across the items.

It is a further goal of the present invention to generate a display that groups items according to a heuristic, where the heuristic may be based upon the relationship between items, the nature of the items, and the characteristics of the display interface, and to provide the ability to pan and zoom across the display of graphical elements representing the items.

It is an additional goal of the present invention to create a hierarchical representation of items in such a display to allow greater ease in traversing large sets of items, and to provide a display mechanism that loads only a portion of the hierarchy or graphical elements to improve efficiency.

It is a further goal of the invention to associate data with the graphical elements such that a user can interact with the display and the display is enabled to provide additional information for the items so represented.

In one embodiment of the invention, a computer system for generating a catalog display for a screen having a viewing area, the catalog having a plurality of products with substantially all products having associated images, with all images being substantially more than viewable within the screen viewing area is disclosed. The computer system has an information categorization module for generating an information relationship between the plurality of products. The relationship may be the similarity between the products based upon a set of characteristics such as set including shape, color, size, manufacturer, price, material, popularity and discount. The computer system further includes an image generation module for generating a set of information tiles based upon the plurality of products with the set of created information tiles forming the catalog display. Each of the information tiles contains at least a portion of one of the associated images.

The image generation may be based upon the relationship, and utilized by the generation module so that the catalog display has similar products of the plurality of products closer. A further refinement of the computer system includes a display module for displaying the catalog display on the screen and to allow panning or zooming of the catalog display through the screen viewing area.

In another embodiment of the invention, a computer system for generating a two dimensional catalog with the catalog having a plurality of entries and an image associated with each of the entries is disclosed. The system includes a catalog storage module for storing the catalog entries and their associated images and a display generation module adapted to retrieve the catalog entries and associated images from the catalog storage module. The display generation module creates the two dimensional catalog display representing a layout of the images associated with each of the entries, the display generation module further adapted to not have a dimensional preference in generating a display and also to scale the images so that the two dimensional catalog display substantially fits within a predetermined boundary. The generation may further utilize a relationship between all the entries in the catalog so that similar items are located closer to one another. The relationship between the entries may take into account characteristics of each of the items, for instance in a catalog of products the characteristics may include shape, color, size, manufacturer, price, material, popularity and discount.

The system may include a display module for displaying the catalog display on a screen and to allow zooming and panning of the catalog display so that a user can interact and view the items in the catalog.

The system may generate a display for a plurality of catalogs and then combine the catalogs into a single display, thus creating a catalog of catalog displays.

An additional embodiment of the invention disclosed is a system for generating information tiles for a tile-based display system for a plurality of items. The system includes an information categorization module for generating an information relationship between the plurality of items, a tile generation module for generating a set of information tiles based upon the plurality of items, where the quantity of information tiles does not equal the quantity of the plurality of items, a tile storage module for storing the information tiles, and a data storage for storing the relationship between the information tiles and the plurality of items.

The information categorization module comprises a collection of descriptive information of the plurality of items with the information relationship based on at least a portion of the descriptive information. The module may retrieve some of the descriptive information from a source separate from the system. The descriptive information may be utilized to generate at least one value, where the value is utilized in generating the information relationship.

In this system the information tiles may represent products with some of the descriptive information may be product descriptions, for instance size, style, product category, color, weight, manufacturer, price, materials, popularity and discount. The information tiles can contain image data, textual data or both. The textual data can be separate of can be merged with the image data, to create a composite image.

A method is also disclosed. The method is for generating an image location value for each of a set of images, wherein at least a portion of the set of images has an associated vector of image values. The steps include generating a comparison matrix based upon comparing the vector of image values for each pair of images in the set of images and generating the image location value based upon the comparison matrix. The image location value may represent a spatial relationship. The image may have a subject and the image values may represent characteristics of the subject. For instance, the set of images may represent a product catalog and the image values may include characteristics for the product.

A second method disclosed is for creating a layout of information images, each information image having an associated vector of values. The steps include generating a image location value for each of the set of information images via the steps of creating an image matrix based upon comparing the vector of values for each pair in the set of information images and generating an image location value based upon the image matrix. Finally, a layout is generated based upon the information images and the corresponding image location value. Again, each of the information images may include a subject with a portion of the values representing data descriptive of the subject.

In a variation of the prior method, a method for creating a layout for multiple sets of information images, each information image having an associated vector of values is disclosed. The steps include for each set of information images generating a image location value for each of the set of information images via the steps of creating an image matrix based upon comparing the vector of values for each pair in the set of information images and generating an image location value based upon the image matrix and the generating a sub-layout based upon the information images and the corresponding image location value. Finally, a layout is generated based upon the sub-layouts.

Generation of the layout may further include positioning of the sub-layouts based upon an attribute of the corresponding set of information images for each sub-layout. The multiple sets of information images may be created from an initial set of images.

An additional variation disclosed is a method for creating a display of a set of items in a catalog containing item information with the item information consisting of at least item image data and item description, and with the display having a display geometry. The steps include selecting a first item from the set of items, and storing it in a set of placed items, placing the image data for the first item in the display, and for each of the remaining items in the set of items selecting a next item based upon a first relationship between the description of the next item with the descriptions of the set of items and placing the next item image data in the display in a position according to a second relationship between the description of the next item with the descriptions of the set of placed items, the next item thus becoming part of the set of placed items, thus the display will contain image data for the set of items. The second relationship may be represented by a matrix of similarities.

Also taught is a method for creating a display of a set of items in a catalog containing item information, the item information consisting of at least item image data and item description and the display has a display geometry. The steps include ordering the set of items based upon a first relationship and storing them into a set of ordered items, selecting a first item from the set of ordered items, and storing it in a set of placed items, placing the image data for the first item in the display. For each of the remaining items in the set of ordered items, selecting a next item from the set of ordered items, and placing the next item image data in the display in a position according to a second relationship between the description of the next item with the descriptions of the set of placed items, the next item thus becoming part of the set of placed items whereby the display contains image data for the set of items. The item description may contain information selected from the set containing price, color, size, manufacturer, availability, location, and material.

In application, the first relationship is a function that maximizes similarity, with the similarity based upon the description of the items. The second relationship is a function that maximizes similarity based upon the position relative to the set of placed items and may be weighted by locational information to maximize the display geometry to a preferred geometry.

A further method disclosed is for creating a display of a set of items in a collection containing item information, the item information consisting of at least an item image representation. The steps include selecting a portion of the items in the collection, collecting the item image representations from the portion, and generating a two dimensional layout in the display of the item image representations according to a relational preference, the relational preference not having a dimensional preference. As a variation, the step of generating a two dimensional layout in the display of the item image representations according to a preference, the preference is for the layout not to be of a predetermined size in either dimension. Alternatively, the step of generating a two dimensional layout in the display of the item image representations according to a preference, the layout may be adapted to allow a zooming or a panning operation.

In these variations, the collection may be a catalog of products and the item preference may be further based upon product description and the preference is based upon the product description that may include product image, price, color, material, manufacturer, availability, location and retailer and the preference is based on the item description. Alternatively, the item preference may be based upon inventory information and the preference is based upon the inventory information or the item preference further based upon transitory information and the preference is based upon the transitory information. In such case the transitory information may include discount, inventory, retailer, location, shipping time, tax and cost and the preference is based on the transitory information.

An additional method is for displaying a catalog of items, and includes the steps of generating a top level view, the top level view adapted to display subcategories of the catalog, generating a bottom level view, the bottom level view adapted to display the items in the catalog, and generating one or more intermediate level views, the intermediate level views adapted to display a scaled portion of the subcategories, a scaled portion of the items, or a combination. Then displaying the top level view on the computer display, capturing user zooming interactions, the user zooming interactions controlling a zoom operation, and then displaying the one or more intermediate level views or the bottom level view in response to the zoom operation.

The display method can additionally include the steps of generating a set of item popup information, capturing a selection user interaction upon display of a chosen level view, the selection user interaction controlling a selection operation for at least one item, and then displaying at least one item popup information in response to the selection operation for the at least one item. In this way, certain information can be overlaid onto the display. The method may also include the step of capturing user panning or zooming interactions to cause a panning or zooming operation on the display.

The present invention can include the use of a tile based display. In addition, the methods can be implemented in a client server environment. To the end, a method for creating a display on the client comprising is taught, and includes the steps, on the server, of creating an picture layout, the picture layout comprising a set of pictures spatially arranged, generating a set of structured images, the structured images representing a decomposition of the picture layout, creating image data files, the image data files containing spatial information relating to the relationship of the spatial layout of the set of pictures and the structured images, and transmitting to the client a portion of the structured images and a portion of the image date files associated with the structured images. On the client, the steps of generating the display on the client based upon the portion of the structured images, and capturing user interactions via the display so as to interact with the portion of the image date files are performed.

A further variation includes a method of creating a catalog display on the client comprising the steps of, on the server, creating a catalog layout, the catalog layout comprising a set of product images spatially arranged, generating a set of structured images, the structured images representing a decomposition of the catalog layout and further being a subdivision of the catalog layout, and transmitting to the client a first portion of the structured images. On the client, the steps of generating the display on the client based upon an initial subset of the first portion of the structured images, and capturing user interactions to allow a panning operation that results in a display of a subsequent subset of the first portion of the structured images or requesting a second portion of the structured images are performed.

A method of synthesizing a picture from a set of tiles, with a portion of the tiles containing at least a portion of picture, utilizes the steps of determining the picture dimensions from a set of image data associated with the set of tiles, selecting the portion of the tiles, and generating the selected picture utilizing the portion of tiles and the image data.

A method of highlighting a catalog display is taught. The method can be used with a catalog display comprising a plurality of item images arrayed in two dimensions, each of the plurality of item images having an associated location and identification, comprising the steps of selecting a portion of items for highlighting by the item identifications, generating an image mask, the image mask having a size to cover at least a portion of the catalog display, the image mask comprising regions of highlights corresponding to the locations of the portion of items, and compositing the image mask on the catalog display so that the item images of the portion of items are matched with the regions of highlights.

Other variations of these systems and methods are disclosed, including the building of the database containing a catalog from the third source, efficient dynamic transmission of tiles to a client from a server, annotations that vary by display level and the capture of user interactions to efficiently traverse the catalog.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 18a is a diagram illustrating the steps in searching the catalog and displaying the results;

DESCRIPTION

System View

In the broadest view, the system consists of two computer roles: a server and a client. The server operates on all or a portion of a product catalog or multiple product catalogs and constructs catalog information consisting of images and data. The client displays the catalog information to the user. Typically, the server creates the catalog information in advance of any interactions with the client. When the client is running it requests images and data to display portions of the catalog to the user. The client also allows the user to interact with the catalog information through mouse and keyboard gestures. The gestures are used to zoom and pan through the catalog display as well as to get more information about specific products. The client converts the gestures into requests to the server for additional parts of the catalog information and adjusts the display accordingly.

This disclosure is organized as follows. First, for reference, a conventional client-server architecture is illustrated. Second, a server architecture that can create the catalog displays and other data that are used in the interface is disclosed. This section of the disclosure has several parts, which describe the various processes in the server architecture and the tasks that they perform. Third, a client architecture that displays the catalogs and supports the various interaction tasks is disclosed. This too is a multi-part section.

Client-Server Environment

Figure 1:
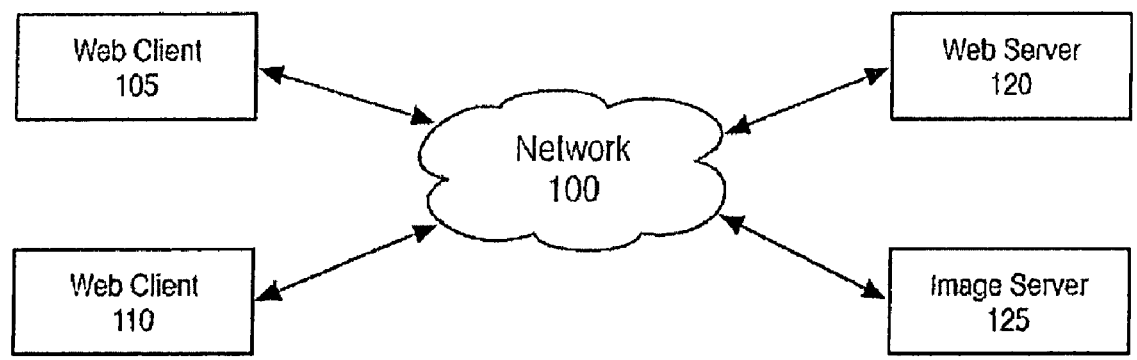
FIG. 1 is a block diagram illustrating a client server environment for use in the present invention.

FIG. 1 is a block diagram of a system configured according to one embodiment of the present invention. As illustrated, the system includes a computing device 105 connected to a network 100 including a web serving system 120 and an image serving system 125. Additional computers are connected to the network and may include one or more servers providing the functionality discussed below.

Figure 1B:
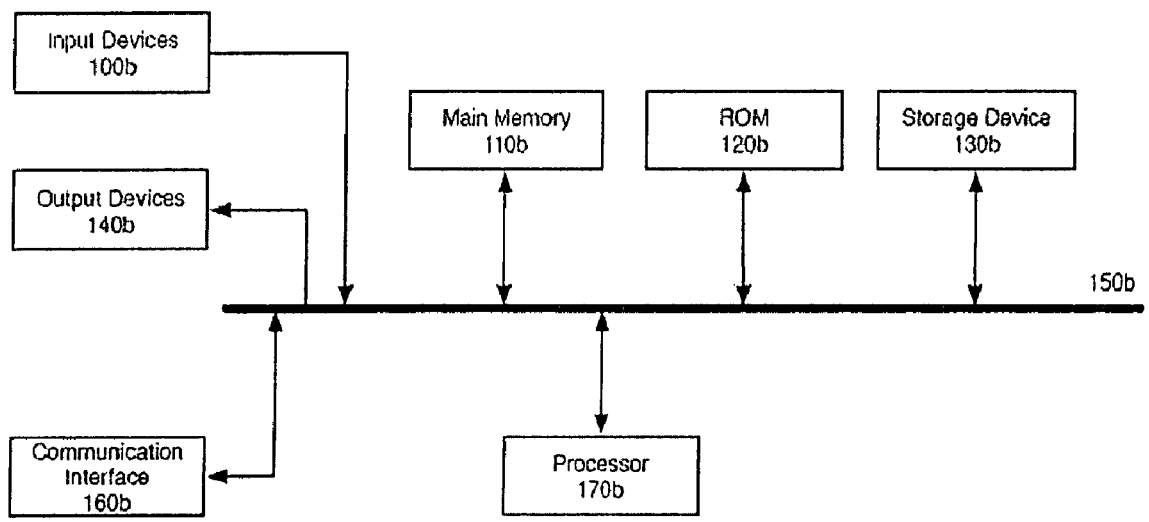
FIG. 1*b* is a block diagram of an exemplary block diagram of conventional computer system capable of being adapted for use as a client or server in the present invention.

FIG. 1b illustrates an exemplary block diagram of a computing device. The servers 120 and 125 as well as the clients 105 and 110 in FIG. 1 may be of this form. With reference to FIG. 1b, computing devices, both clients and servers, may include a bus 150b, one or more processors 170b, a main memory 110b, a read-only memory (ROM) 120b, a storage device 130b, one or more input devices 100b, one or more output devices 140b, and a communication interface 160b. The bus 150b may include one or more conductors that permit communication among the components of the computing device.

The process 170b may include any type of conventional processor, microprocessor, or processing logic that interprets and executes instructions. The main memory 110b may include a random-access memory (RAM) or another type of dynamic storage device that stores information and instructions for execution by the processor 170b. The ROM 120b may include a conventional ROM device or another type of static storage device that stores static information and instructions for use by the processor 170b. The storage device 130b may include a magnetic and/or optical recording medium, a corresponding drive to move the medium and a corresponding sensor to read the magnetic or optical signal.

The input device(s) 100b may include one or more conventional mechanisms that permit a user to input information to a compute device/server, such as a keyboard, a mouse, a pen, a stylus, handwriting recognition, voice recognition, biometric mechanisms, and the like. The output device(s) 140b may include one or more conventional mechanisms that output information to the user, including a display, a printer, a speaker, and the like. The communication interface 160b may include any transceiver-like mechanism that enables a computing device/server to communicate with other devices and/or systems. For example, the communication device 160b may include a network interface.

The clients and server computing devices may perform operations based on software instructions that may be read into memory 110b from another computer-readable medium, such as a data storage device 130b, or from another device via the communication interface 160b. The software instructions contained in the memory 110b cause the processor 170b to perform processes that will be described later. Alternatively, hardwired circuitry may be used in place or in combination with software instructions to implement processes consistent with the present invention. Thus, various implementations are not limited to any specific combination of hardware circuitry and software.

Server—System Overview

Figure 2:
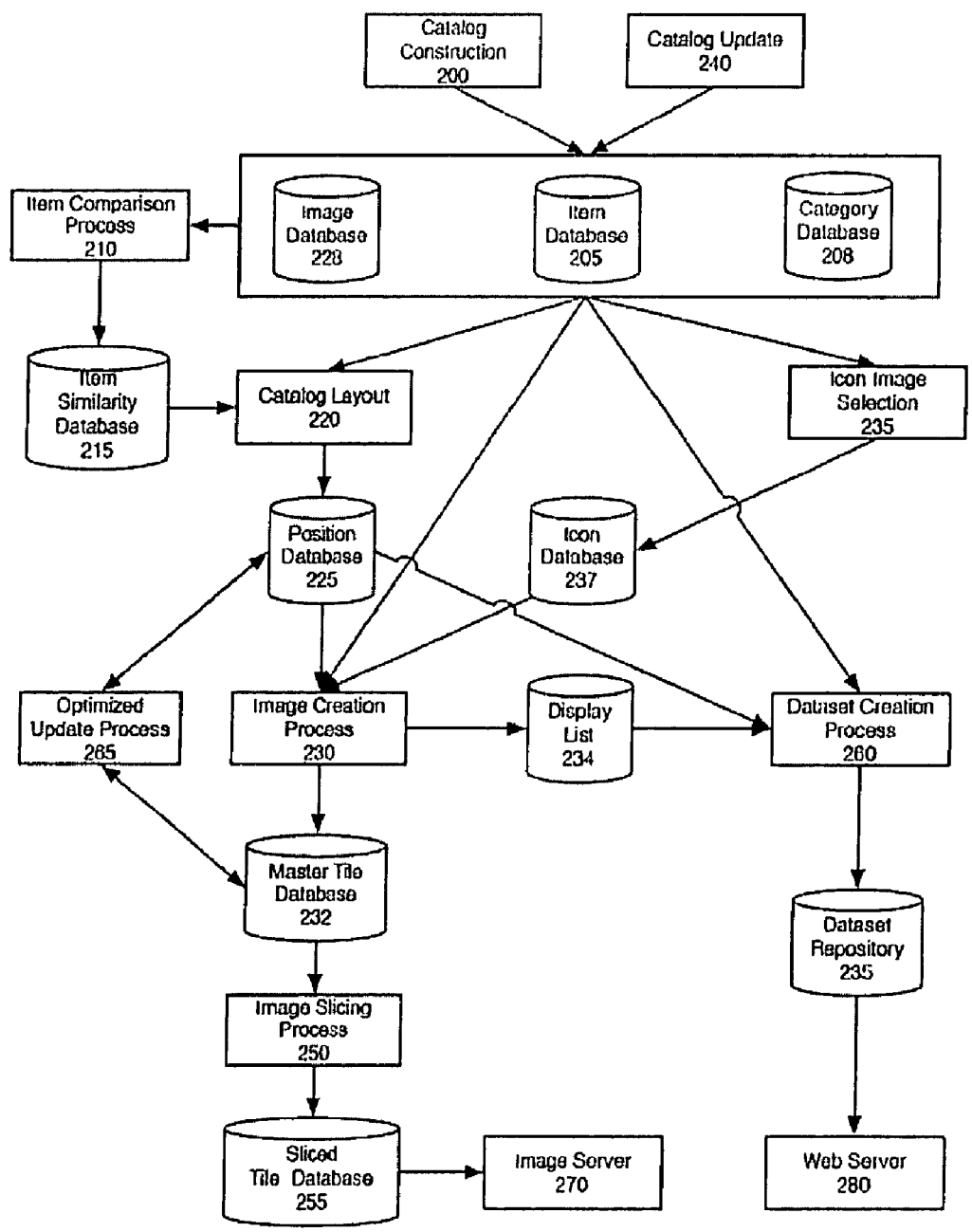
FIG. 2 is a system overview block diagram illustrating the components of an embodiment of the present invention.

FIG. 2. Is a block diagram of a processing environment that can be employed in the server system of FIG. 1. For instance, any servers included in the serving systems 120 and 125 can be configured using the illustrated processing environment. Numerous other processing environments can be used as well, and the present invention is not intended to be limited to any one such embodiment—FIG. 2 is merely provided as one possible example. According to the embodiment depicted, the server consists of a set of processes that run to prepare the catalog information. These processes typically are run before the client 105 is launched. While the client 105 is running a browser, the server 120 runs a web server that delivers content to the client.

The catalog information is created through the sequence of the following processes: a catalog construction process 200, a catalog update process 240, an item comparison process 210, a catalog layout process 220, an icon image selection process 235, an image creation process 230, a dataset creation process 260, a image slicing process 250 and an optimized update process 265.

An image server 270 is part of the server system. It process requests from the web client 105 and provides images from the slice tile database 255 as responses.

A web server 280 is also part of the server system. It processes requests from the web client 105 and provides the catalog information from the dataset repository 235 in response.

Many of the processes used to construct the catalog information consists of more than one step. The catalog construction process 200 includes a catalog harvesting step, a catalog update step, a category inference step and an image retrieval step. The catalog construction process creates records in an item database 205, and an image database 228. The item harvesting step interacts with catalog providers to harvest information about the current contents of product catalogs. The category inference step produces the hierarchical categorization of items in the item database 205 that will be used for display. At least a portion of the category information retrieved from the catalog provider may be used to construct the categories in the database 208. The image retrieval step requests the images for the products in the item database and stores the images in the image database 228.

The catalog update process 240 updates the item database 205 and the category database 208 from one or more providers and from the previous state of the database itself.

The item comparison process 210 includes an image comparison step, an attribute value comparison step, and an item comparison step. The item comparison step compares pairs of items by their images and attributes. The process uses information in the item database 205, and stores values in the item similarity database 215.

The catalog layout process 220 includes an item positioning step, category measurement step and a category positioning step. This process uses the information in the item similarity database 215, and creates item and category position records stored in the position database 225. The item positioning step arranges the items within a category based on their properties and possible similarities. The category measurement step computes the width and height of each category. The category positioning step arranges the subcategories within a category. The position database 225 stores the spatial extent of each item and category.

The icon image selection process 235 identifies a representative image for each category. The image will be used as the icon for the category when the catalog is displayed. The results of this process are stored in the icon database 237.

The image creation process 230 includes a display list creation step and a rendering step. The display list creation step uses the information in the item database 205, the position database 225, the icon database 237 and the image database 228 in conjunction with styling information to create a display list 234. The rendering step uses the information in the display list to create a set of master tiles 232.

The dataset creation process 260 uses the display list 234, item positions 225, catalog positions 225 and item database 205 to create computer-readable descriptions of the items and categories at each position of each catalog display, including the properties of items and categories and the positions of labels and other adornments.

The image slicing process 250 produces a larger number of sliced tiles 255 out of the master tile images 232 that the image creation process 230 creates.

The optimized update process 265 contains an data-only update step, a tile update step, and a layout substitution step. The data-only step invokes the dataset creation process 260 when catalog changes do not involve anything displayed. The tile update step renders master tiles 232 that display information that has been changed by a catalog update. The layout substitution step updates the position database 225 to place items in the locations reserved for items with a special role e.g. the most popular ten items in a category.

In the preferred embodiment, the web server 280 is an Apache server (www.apache.org) running on a Linux operating system (www.linux.org). The requests come in as HTTP requests (IETF RFC 2616; http://www.w3.org/Protocols/) and the responses are Javascript program files (ECMA-262; http://www.ecma-international.org/publications/standards/Ecma-262.htm), image files in JPEG (http://www.jpeq.orq/) or PNG (http://www.w3.org/.Graphics/PNG/) format, or data files in HTML (http://www.w3.org/MarkUp/), XML (http://www.w3.org/XML/) or plain text format.

Alternative embodiments of the invention would place these processes and databases on a different number of machines, distributing the processes from a minimum of a single machine to many diverse and distributed machines with perhaps one of more machines dedicated to a single process. A simple extension would be to separate into two servers the handling of the requests for images and the requests for other data types. A load balancer could direct the client requests for images to one or more image servers separate from the web server or specific image requests could be directed by the client to a specified series of images servers.

Catalog Construction Process

There are many product catalogs available in electronic form. These catalogs list products available for purchase from a vendor, fulfillment organization, price/product comparison service, merchant or manufacturer. The catalog typically includes identification codes for the product (e.g. UPC) and textual descriptions of the product: e.g., a title, and a paragraph or two describing the product. The catalog also may include additional product information (attributes) including the price, availability and shipping terms. Product images can also be included in catalogs. The catalog itself can be a single list or it may be organized into a hierarchical set of categories, where each product is assigned to one or more categories. Within the catalog, a product can be in more than one category. For example, a flashlight may be listed both as a camping product and an emergency product. The combination of a product and a category is generally referred to an item. Items are typically the unit of layout, display, and interaction in the layout, imaging, and browser processes.

Figure 3:
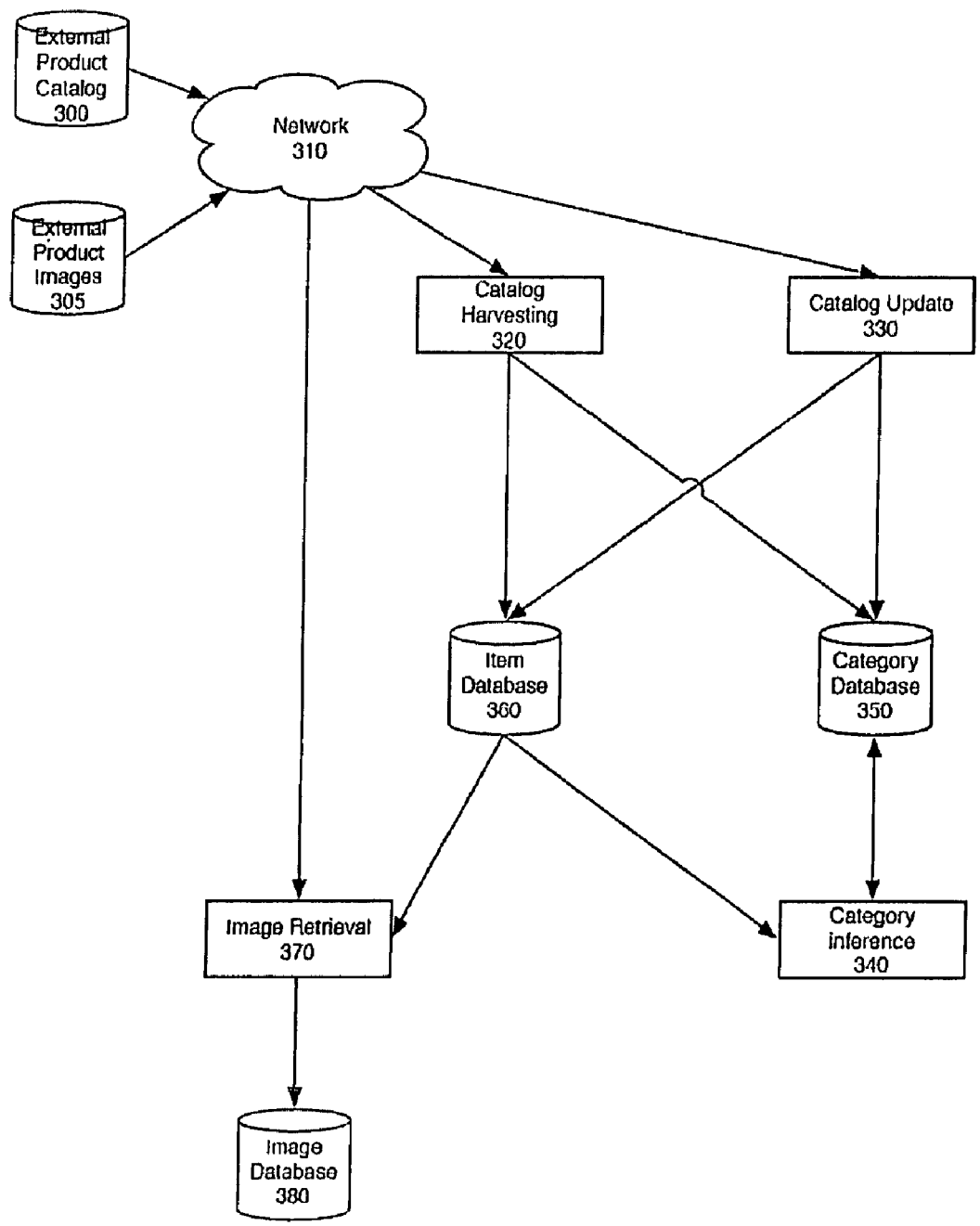
FIG. 3 is a block diagram of the catalog construction and update processes of an embodiment of the present invention.

The catalog harvesting process 320, shown in FIG. 3, retrieves information from an external electronic catalog 300 via HTTP requests over the network 310 and stores it in a set of records in a database internal to the system 350 and 360. The information received may be converted prior to storage in the database (for instance, the size of the data fields, language translation of any descriptive text, price conversions, etc.). In addition, the whole catalog may not be stored or retrieved; perhaps only a portion of the catalog, according to certain criteria (product and manufacturer selection, availability, etc.), is stored or retrieved.

The preferred embodiment uses the Amazon product catalog as the external product catalog and the harvesting of the Amazon catalog data is done via a set of APIs provided by Amazon. The APIs are knows as the Amazon E-Commerce Service (ECS) and are part of Amazon's Web Services (AWS) (see http://aws.amazon.com). Information is retrieved by making an HTTP GET request to an Amazon ECS server. The response to a request is an XML document with structured data that is then converted into records for storage in the database.

The first task in collecting the product catalog is to walk the Amazon category hierarchy storing the basic node information from that tree into internal database records. The categories are walked starting with the most general category of interest, the root of the category tree, and from there down toward the leaves.

An ECS BrowseNodeLookup request is made to find the information about a single category. The request takes as an argument a browseNodeId, Amazon's identifying code for a category. A typical request is as follows:

```
http://webservices.amazon.com/onca/xml?Service=AWSECommerceService&Version=2005-03-23&Operation=BrowseNodeLookup&SubscriptionId=[id]&BrowseNodeId=1045744&ResponseGroup=BrowseNodeInfo
```

The response to the request is formatted as XML. This is a typical response:

```
<BrowseNodeLookupResponse>
    <OperationRequest>
    <HTTPHeaders>
<Header Name="UserAgent" Value="Mozilla/5.0 (Macintosh; U; PPC Mac OS X
Mach-O; en-US; rv:1.8.0.4) Gecko/20060508 Firefox/1.5.0.4"/>
</HTTPHeaders>
<RequestId>14QEB7GKJ74DXW8HQ6CB</RequestId>
    <Arguments>
<Argument Name="Service" Value="AWSECommerceService"/>
<Argument Name="BrowseNodeId" Value="1045744"/>
<Argument Name="SubscriptionId" Value="0525E2PQ81DD7ZTWTK82"/>
<Argument Name="Version" Value="2005-03-23"/>
<Argument Name="ResponseGroup" Value="BrowseNodeInfo"/>
<Argument Name="Operation" Value="BrowseNodeLookup"/>
</Arguments>
<RequestProcessingTime>0.0218510627746582</RequestProcessingTime>
</OperationRequest>
<BrowseNodes>
<Request>
<IsValid>True</IsValid>
<BrowseNodeLookupRequest>
<BrowseNodeId>1045744</BrowseNodeId>
<ResponseGroup>BrowseNodeInfo</ResponseGroup>
</BrowseNodeLookupRequest>
</Request>
<BrowseNode>
<BrowseNodeId>1045744</BrowseNodeId>
<Name>Men's Shoes</Name>
<Children>
<BrowseNode>
<BrowseNodeId>1045746</BrowseNodeId>
<Name>Athletic & Outdoor</Name>
</BrowseNode>
<BrowseNode>
<BrowseNodeId>1045760</BrowseNodeId>
<Name>Boat Shoes & Moccasins</Name>
</BrowseNode>
</Children>
</BrowseNode>
</BrowseNodes>
</BrowseNodeLookupResponse>
```

The response is parsed using the PHP expat XML parser (see http://www.php.net/xml). The response includes the category name, and the browse node ids and names for all sub-categories of this category. A category record is created for each category that is returned in the Amazon ECS response. The table in the categories database 350 has columns for Amazon browse node id for the category, the category name and a set of timestamps that track when the category was inserted, updated, checked and checked for products.

After a category is retrieved and inserted into the database, all of the information for all of the subcategories (children in Amazon terminology) is recursively retrieved by making requests for the information from Amazon using the subcategories' browse node ids.

As a second task, for each category at the leaves of the category tree a request is made to retrieve the products in this category. To retrieve product information, an ItemSearch request is made to the ECS server specifying a single category, which in Amazon terminology is called a "Browse-Node". The request specifies that the response should include the following information: ASIN, brand, title, URL, item attributes, images, sales rank, offers and variations. The following is a typical request:

--- http://webservices.amazon.com/onca/xml?Service=AWSECommerceService&Version=2005-03-
23&Operation=ItemSearch&SubscriptionId=[id]&SearchIndex=Apparel&BrowseN
ode=1045744&Condition=New&MerchantId=All&ResponseGroup=Medium,Offers,Va
riations

---

The response to an ItemSearch request can contain a maximum of ten products; each group of ten products is called a page. If there are more than ten products in a category, then additional requests must be made to retrieve them. The response to the initial request contains a field for the total number of products ("TotalResponses") and a separate field for the total number of pages ("TotalPages"). The request to retrieve the eleventh thru twentieth product specifies an "ItemPage" value of 2 and so on for all of the products up to the limit.

The requests are made from the server using PHP code that does an HTTP request using the PEAR PHP library (see the PEAR documentation for HTTP requests:
http://pear.php.net/manual/en/packaqe.http.http-reguest.php).

The XML product data is parsed use the XML parser and from that information three separate record types may be created: product records, offer records, and, optionally, product variation records and stored in the item database 360. The product records store the basic information about the product including:
Amazon's internal product identification number ("ASIN")
title
product description
brand
list price
small image url
small image width and height
large image url
large image width and height
size (if applicable)
color (if applicable)
inserted, updated and checked timestamps The offer records store information about a merchant offering this product for sale at a specific price. The following columns are contained in the offers table:
product id: the related product id
merchant id: Amazon's id for this merchant
merchant name
price
sale price (optional)
active
inserted, updated and checked timestamps Associated with each product in the response is a set of offers. Many products have only one offer, but some products are offered for sale by more than one Amazon merchant and the response will list several offers. A separate record is stored for each offer.

There is also a case where there are no offers for a product. For shoes and other apparel that are sold in a number of different sizes and colors, there is a separate Amazon identifying code (ASIN) for each variation of the product. That code is what is used by Amazon to record an order for the product. There may also be different prices for each variation of the product. For example, the pink men's size XL T-shirt may be on sale for $3.99 while the rest of the colors and sizes may be selling for $12.99.

When variations exist, each Item structure in the response to the ItemSearch request contains the normal product information for the main product ("the generic product"), but no sizing, colors or offers since the generic version of the product is simply representative of a set of products cannot be sold on it own. In addition to the normal product information, the item contains a variations structure that contains the details about the different variations of that generic product. A separate database record is created for each variation in the item database 360.

The variations records are stored in the same database table as the products, but they have a parentProductId field that contains the id of the generic version of the product. The offers returned with the variations are also stored in separate records.

For each product found in the response to the ItemSearch, a record is created that associates the product with the search category. Products are often in multiple categories and the product categories table stores that relationship: e.g. rain boots will be in the boots category and in the waterproof shoes category. There will be multiple product categories records for these products. The records will have the same product id, but different category ids (see the table description below).

The product categories table contains the following columns:
category id
product id
active
inserted, updated and checked timestamps After all of the pages of the ItemSearch are retrieved, all of the products for the category have been retrieved and the category record in the database can be updated to record when the products were last checked. This updates the product check time column.

Products in a catalog may not necessarily be found in leaf categories. For instance, products may have been inserted into a high level category by default, rather than sorted into a subcategory. For instance, a product may be found in the top level men's shoe category, even though it should be sorted into hiking boots. Thus, the system is adapted to check for products at all nodes of the category tree. Once retrieved, it is possible to automatically place these products into a particular node of category tree, or even create a new leaf node to capture these unsorted products.

The system is designed to simultaneously support multiple types of goods. For example, it can harvest the catalog for different products such as shoes and furniture (from the same or different sources). To make the queries simpler and faster the database tables for categories and products have an additional column called "store". This field records the overall type of good in this product category tree so that all products and categories in a particular tree will have the same value e.g. "shoes".

The system can also support different sources for the product catalog. We have described retrieving the data from Amazon, but it could also come from eBay or Yahoo stores. The system could also simultaneously support multiple sources for product catalogs with the categories from the different sources. For example, we could combine shoes from Amazon and from Zappos. The women's high-heeled pumps from both stores would be combined into a single display category. The external category ids for each source would be maintained in a separate table that would also record the data source. In addition, products can be combined using UPC code, EAN or other identifying information. When products were combined they could store the set union of the offers from all of the sources for that product allowing price comparison between vendors.

The system could also retrieve the product catalog from a product data feed rather than using an API. A product data feed is a file that lists products that a merchant sells. The file can either be in plain text format with each line of the file representing a single product and the separate fields delimited by a special character, an RSS document, or a set of XML documents. The file can be retrieved via FTP from the merchant's FTP server or downloaded from a special URL. The product database can be populated from the information in the feed.

In other embodiments, the product database can be populated by scraping product data from an online store. This would be done by retrieving the store's web pages that show the details of each product and extracting from the HTML the fields that describe the product. For example the product price could be retrieved from the HTML as well as the product title and picture.

The product catalog may additionally contain attributes for some of the products. These attributes can be retrieved along with the basic product information and stored in the internal database in an attribute values table.

The category records harvested from Amazon form a tree that represents the category hierarchy. For example, the shoes category contains the women's shoes category and the men's shoes category. The women's shoes category contains the pumps, flats, mules, sneakers and boots categories. The categories defined by Amazon are not always the ideal ones for the catalog display. Some categories may be too small, some may be badly organized, some may be misplaced in the tree, and some may be too large. The catalog inference step 340 creates a set of category records based on the Amazon categories, but with modifications to improve the display.

There are many ways to modify the categories to rearrange the category tree. For example, subcategories with very few products can be removed with all of the products in the subcategory treated like there were in the parent category. Subcategories can also be merged with other parallel subcategories. Categories can be renamed. Categories can be simply ignored and all of the products in the category ignored. Categories can be split with some of the products going into one newly created subcategory and some into another.

When products have attributes, the attributes can be used to create categories. For example, if the products are used cars, then the year that the car was manufactured may be an attribute of the car. The year attribute can be converted into node in the category tree with all of the cars made in the 1970s in one branch and all of the ones in the 1980s in a different branch, etc. This approach can be used to convert any attribute into a node in the category tree. That node can be placed within the existing category tree. It can become the top node in the tree duplicating all of the other nodes or it can be placed at the leaves of the tree.

The catalog display being generated is a visual representation of a catalog of products and products that do not have images or that do not have good quality images may not be included in the catalog display image. This can extend to products having images with non-preferred backgrounds.

Some products have images that are exactly the same as other products. In some cases this is simply an accidental duplication in the product catalog and in other cases the same image was used for two different products. To make the catalog display image less confusing, the products with duplicate images may be eliminated.

In the image retrieval step 370 an image is retrieved from the network 310 for each item in the item database 380. In the preferred embodiment, this retrieval is performed by executing an HTTP request to the external product images server 305. The URL that is requested is stored as the value of the imageURL field of the item's record in the item database 360.

Catalog Updating Process

Once a product catalog is harvested and converted into database records it can be updated from the catalog source to reflect changes in the catalog. The catalog update process 330 of FIG. 3 picks up price changes, new products, products no longer sold, and new offers from other merchants.

Updating does not delete database records for products no longer available, but instead simply marks them as inactive. Updating is preferable to deleting all of the database records and re-populating the database from scratch since if we can identify what has changed, then some of the downstream processes may not have to be re-run. In addition, by not clearing the database, products, categories and offers will still have the same database ids and the ids can be used as indices for the storage of derived data.

Although it doesn't start with an empty database, the update process is very similar to the initial harvesting process. Each active category in the categories table is checked using the Amazon ECS call ItemSearch to retrieve the products in the category. If new products are found in the response, they are added to the table of products in the item database 360. If new offers are found for a product, then records are added to the offers table. If after all the offers for a product have been checked in the response, an existing offer is no longer found then it is marked inactive. Whether the offer is still in existence is computed using the offer records' timestamps. When the process starts the database times is recorded as the start check time. As the offers are seen, their corresponding records are updated in the database with the current time as the checked time. Thus, products that were marked as inactive that are now active are marked as such. When all of a product's offers have been checked, any offer for this product recorded in the database that has a checked time earlier than the start check time is now marked inactive. There is a separate column in the offers table for the active field.

After all of the results pages have been checked for a given category, any product in this category that was not found must no longer be active in this category. This is noted in the database by marking inactive the product categories records for these products for the current category. There is a separate Boolean column in the product categories table for active. Similarly, new product variations are added to the products table and variations that are no longer in the catalog are marked inactive using timestamps on the variation records.

After all of the categories have been checked, any product record that hasn't been checked in this sweep of the updating the product database from the catalog must no longer be active. Again this is done using timestamps and the product records are marked inactive.

Item Comparison Process

Figure 4:
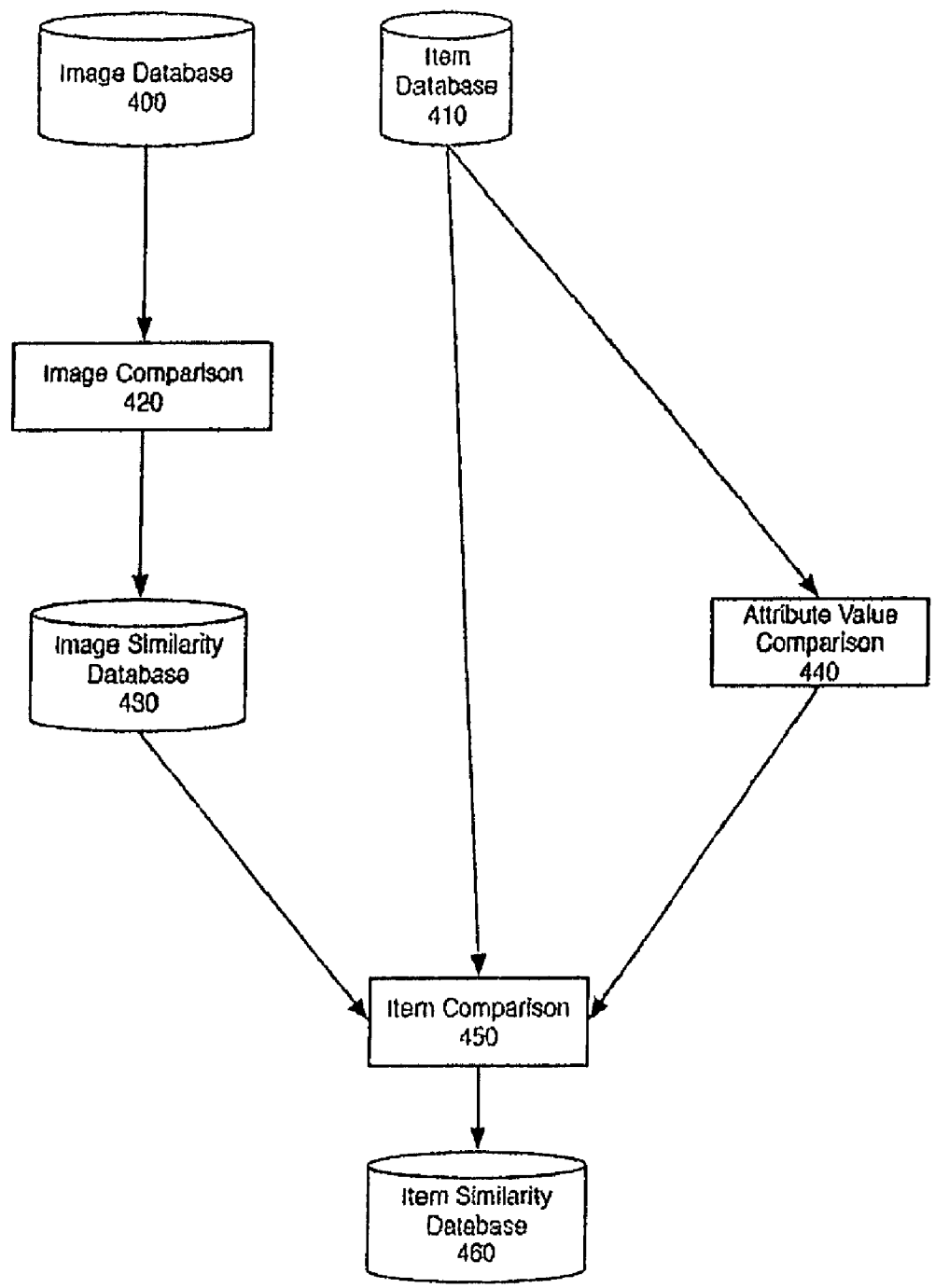
FIG. 4 is a block diagram of the item comparison process of an embodiment of the present invention.

A goal of the present invention is to organize items so that items nearby in the layout are similar. FIG. 4 illustrates the item comparison process. The image comparison step 420 computes the visual similarity between the images associated with pairs of items. The attribute value comparison step 440 computes the similarity between the attributes associated with pairs of items. The item comparison step 450 uses the image similarity and attribute similarity measures to compute a synthetic item comparison measure between each pair of items within a category.

A sub-goal is to organize items so that products nearby in the layout are visually similar. In the shoe example, this can be done using visual attributes such as boot height and toe shape. In some cases the attributes may already be in the product catalog on the data source, but often it is not possible to find the attributes in a structured representation.

Figure 12:
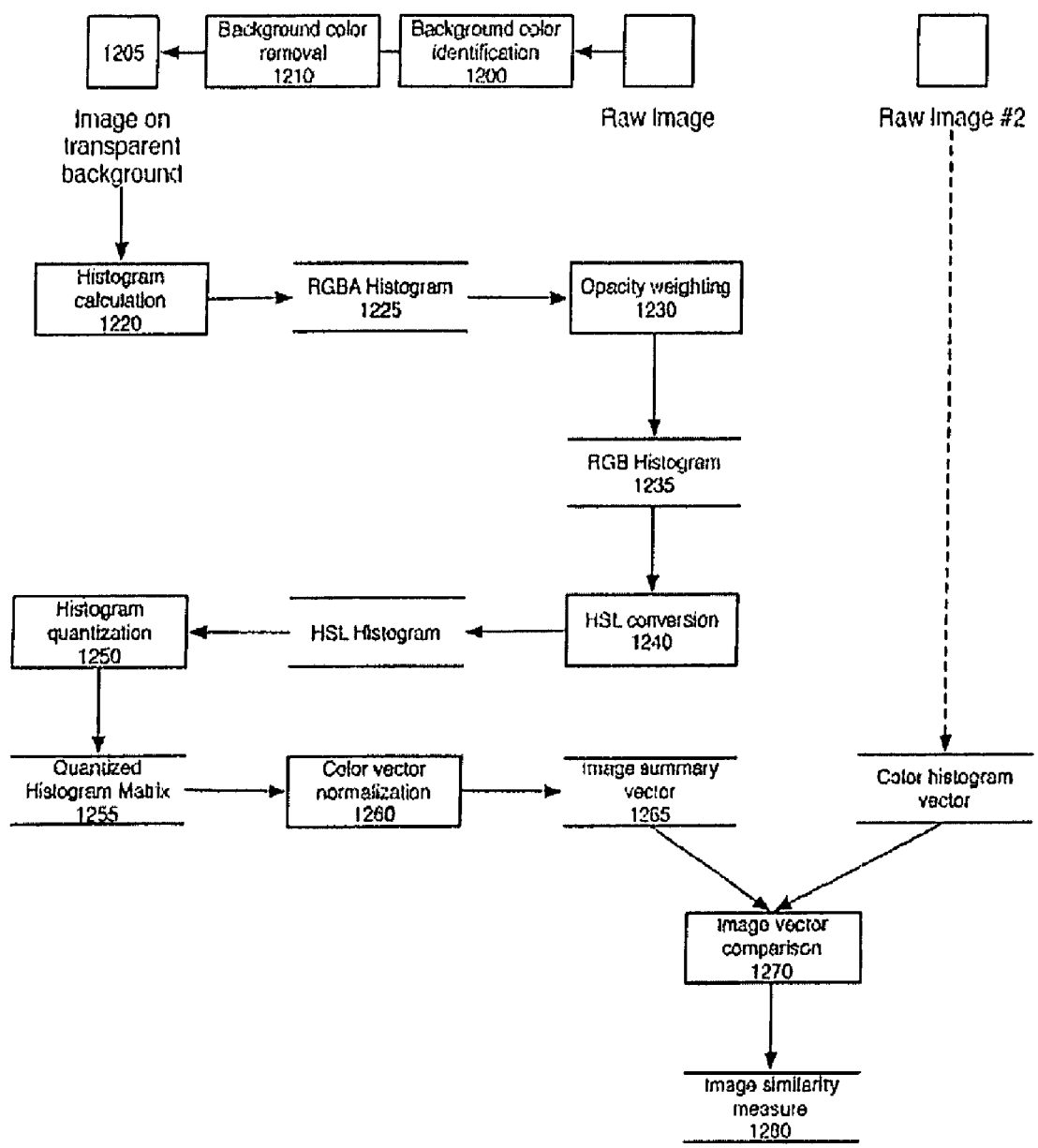
FIG. 12 is a block diagram illustrating the steps in the image comparison process of an embodiment of the present invention.

The image comparison step 420 computes these comparisons from the product images in the image database 400. FIG. 12 illustrates an image comparison step.

Two images are compared by comparing their colors. Since the images are not a single color, but are composed of many pixels each typically of a different color, they cannot be directly compared. Instead the colors in each image are summarized by a histogram and the histograms are compared. Since the images can be partially transparent, the histograms are computed with less weight given to pixels that are more transparent and more weight given to pixels that are more opaque. The effect is that different products that are photographed against the same background are not falsely judged similar and instead of the backgrounds being dominant in the comparison, the actual product portion of the images dominate the comparison.

More specifically, the algorithm compares histograms that summarize the number of pixels that inhabit each region of a hue-saturation-lightness (HSL) cube. With reference to FIG. 12, in order to create these histograms, each image is first replaced by an image where pixels of the background color is identified 1200 and replaced 1210 by transparent pixels 1205. The number of pixels at each color value is computed 1220. These counts are weighted by the pixel opacities 1230, and transformed 1240 into HSL colors. Each color is assigned to a region of the HSL cube 1250. Finally, the weighted sum for each region is divided by the weighted sum of the entire HSL cube 1260, to create a list of values, one per region, that summarize the image colors and that sum to unity.

In detail, the Image Summary Vector is created via the following steps. First, the background color of the image is identified 1200. If the color values of the pixels at the four corners of the image are equal, this color value is assumed to be the background color. If the color values of the pixels are different, the image is assumed not to have a background color, and background color removal 1210 is skipped (in other words, the "image with transparent background" is identical to the "raw image").

Second, a copy of the image, "image with transparent background" 1205 is created at 1210. This copy is identical to the raw image except that where a pixel of the raw image has a color that is identical to the background color identified in 1200, the corresponding pixel of the copy is assigned an opacity of 0. All other pixels have the opacity of the corresponding pixel in the original image. (This value is typically 1.0.)

Third, at 1220, the RGBA Histogram 1225, a finite map of color values to counts, is created. The domain of this map is the set of color values, with opacity. The co-domain is the positive integers. The entries specify, for each unique color value in the image with transparent background, how many pixels have that color value. For the purpose of this calculation, two color values are unique if they differ in any component, or in their opacity. This finite map is constructed by enumerating the pixels of the image. For each pixel, if its color value is not present as a value in the RGBA histogram, an entry that maps that value to 1 is entered into it. Otherwise, the value of the entry for that color value is incremented by one.

Fourth by opacity weighting 1230, the RGB Histogram 1235, a second finite map, is constructed from the RGBA Histogram 1225. The domain of this map is the set of color values without opacity. The co-domain is the positive real numbers. There is one entry in this map for each unique RGB value present in the RGBA Histogram, such that that value has a non-zero opacity. Two entries in the RGBA Histogram that differ only in opacity will result in a single entry in the RGB Histogram. Each entry in the RGB Histogram contains as its value the weighted sum of the entries in the RGBA Histogram, where each entry is weighted by the value of its opacity. For example, if the RGBA Histogram contains an entry that maps red at 1.0 opacity to the value 10 (10 pixels have that color), and another entry that maps red at 0.5 opacity to the value 10, and no other entries for red, then the RGB Histogram will contain an entry that maps red (with no opacity specified) to the number 15.0, because 1.0*10+0.5*10=15.0. If the RGBA Histogram contains an entry mapping white with a zero opacity to 100, and no other entries for white (with any opacity), then the RGB histogram will contain no values for white.

The HSL conversion 1240 and histogram quantization 1250, the RGB Histogram 1235 is used to create a 3×3×3 matrix, the Quantized Histogram Matrix, that summarizes the number and opacity of pixels within each region of HSL (hue, saturation, lightness) space. The matrix is initialized to all zeros. For each entry in the RGB Histogram, the key of that entry (the color) is translated into HSL space, to produce three components, hue, saturation, and lightness, each in the real number range [0, 1]. Each component, c, is mapped from the real number range [0, 1] to a member of the discrete set {0, 1, 2} by the formula min(floor(3*c), 2). This computation yields a tuple of integers in the range [0, 2]. The components of this tuple are the indices into the Quantized Histogram Matrix 1255. The entry at this index is incremented by the value of the corresponding entry of the RGB Histogram.

Color vector normalization 1260, a vector, the Image Summary Vector 1265, is created from the Quantized Histogram Matrix 1255. This vector differs from the Quantized Histogram Matrix 1255 in two ways. First, the Image Summary Vector 1265 is a rank 1 vector with dimension 27 (3×3×3). The Quantized Histogram Matrix 1255 is a rank 3 matrix with dimensions (3, 3, 3). Second, the elements of the Image Summary Vector 1265 sum to 1.0.

More formally, the Image Summary Vector 1265 is created as follows. If V denotes the Image Summary Vector, and M denotes the Quantized Histogram Matrix, then V[i*9+j*3+k]=M[i][j][k]/sum, where sum is the sum of the elements of M.

The scalar Image Similarity Measure 1280 of two images is the inner product of their Image Summary Vectors 1265: the sum of the products of corresponding components (components with the same indices) of the two vectors.

Further refinements and extensions are possible. The histogram can be quantized at different quantization levels, and these quantizations can be combined into a single vector. For example, the RGB Histogram can be quantized into a 2×2×2 HSL matrix, a 5×3×3 HSL matrix (with a greater number of dimensions for hue), and a 7×3×3 matrix, and the items in these can be appended into a vector with 146 (8+75+63) items.

The Image Summary Vector 1265 can encode information other than data from the quantized histogram. For example, it can encode information about the shape of the object. If each item in a 3×3 matrix is assigned the number of non-transparent pixels that occur in the (x, y) image positions such that x and y are quantized into the index of that item, through the histogram quantization 1250 method described above, then this matrix is a rough measure of the object's shape, and the nine items of the matrix can be normalized and appended to the color vector to form the Image Summary Vector. The image vector comparison algorithm will then compare both the colors and shapes of two images, simply by multiplying the two vectors. More sophisticated summaries of image properties, such as spatial frequency components along various dimensions, can also be used as components in the similarity vector.

The components of the Image Summary Vector 1265 can be weighted differently for the purpose of image comparison, by multiplying each component by a different number prior to computing their inner product. For example, similarities in high-saturation colors can be given greater weight than similarities in low-saturation colors by multiplying the components of the vector that correspond to components of the histogram matrix that represent colors with high values of saturation, by a number greater than one. Or, in the extension above where the image summary vector encodes both color information and spatial information, the components that correspond to color information, or the components that correspond to spatial information, can be multiplied by different numbers in order to give color information and spatial information different relative weight.

The Image Summary Vectors can be combined differently than by their inner products, for example by combining each one vector that represents a color with a given hue with all components of the second vector that represent that hue, with different weights depending on the difference in saturation or lightness.

Some visual attributes of products can be derived from the product images e.g. color and possibly shape. But these simple attributes are inexact when the product photographs are shot at different angles, with different lighting and with different backgrounds. Attributes may also be automatically derived from the textual description, but again this requires the descriptions to be consistently written. While time-consuming, it is typically more reliable to add attributes to the product by hand.

Four database tables are used to represent the attributes and the associated values:
- attributes: a description of an attribute include the title and the category of products to which it applies e.g. the heel height attribute applies to women's pumps
- attribute values: a possible value that an attribute can take on e.g. high for the heel height attribute
- example products: a reference to a product that exemplifies the specified value of the attribute e.g. a reference to a shoe with very high heels
- product attribute values: an assignment of an attribute value to a product A conventional web-interface can be used to assign attribute values to products. An individual is presented with a product image, the title of an attribute and pictures of the example products for the possible values for this attribute. The individual selects the best match from among the example products and this value assignment is saved into the database as a product attribute values record. By this process attribute values are assigned to the products.

The attributes are defined in a separate step again using an interface built using forms on web pages. Some categories must just have one or two attributes while others may have four or five.

All attribute values have numeric values so the attribute values can be compared 440 of FIG. 4 and a similarity measure can be calculated for two products in the same category. The similarity function may include a different weighting for each attribute. For example, pumps might have the attributes of "heel height", "toe shape" and "strap type". Heel height may be much more highly weighted in the comparison between products than strap type.

FIG. 4 illustrates the item comparison process. The item comparison step 450 uses the image similarity database 430, and the results of the attribute comparison step 440, to construct a structure 460 that describes the similarity of each two items within a category. This structure consists of a list of item identifiers, and a matrix whose entries are the similarity measures. If the identifiers belonging to two items a and b are present at positions i and j in the list, then their similarity measure is present at the ith column of the jth row of the matrix, and also vice versa.

The item comparison step is applied to all the items within each category, to produce a comparison matrix for each category.

More formally, the matrix is constructed by iterating through each pair of indices $\{(i, j) | 0 <= i < j < |L|\}$ in the list of item identifiers L, and assigning to M[i][j] and M[j][i] a weighted average of these values, where A and B are the items whose ids are L[i] and L[j], respectively: the similarity measure of the images associated with A and B, and a number that is 1.0 where A and B share the same brand and 0.0 where their brands are different. In an extension, this weighted average could also include other values, such as a value inversely proportional to the difference in the prices of A and B, or values that summarize the similarity of other attributes.

Catalog Layout Process

Figure 5:
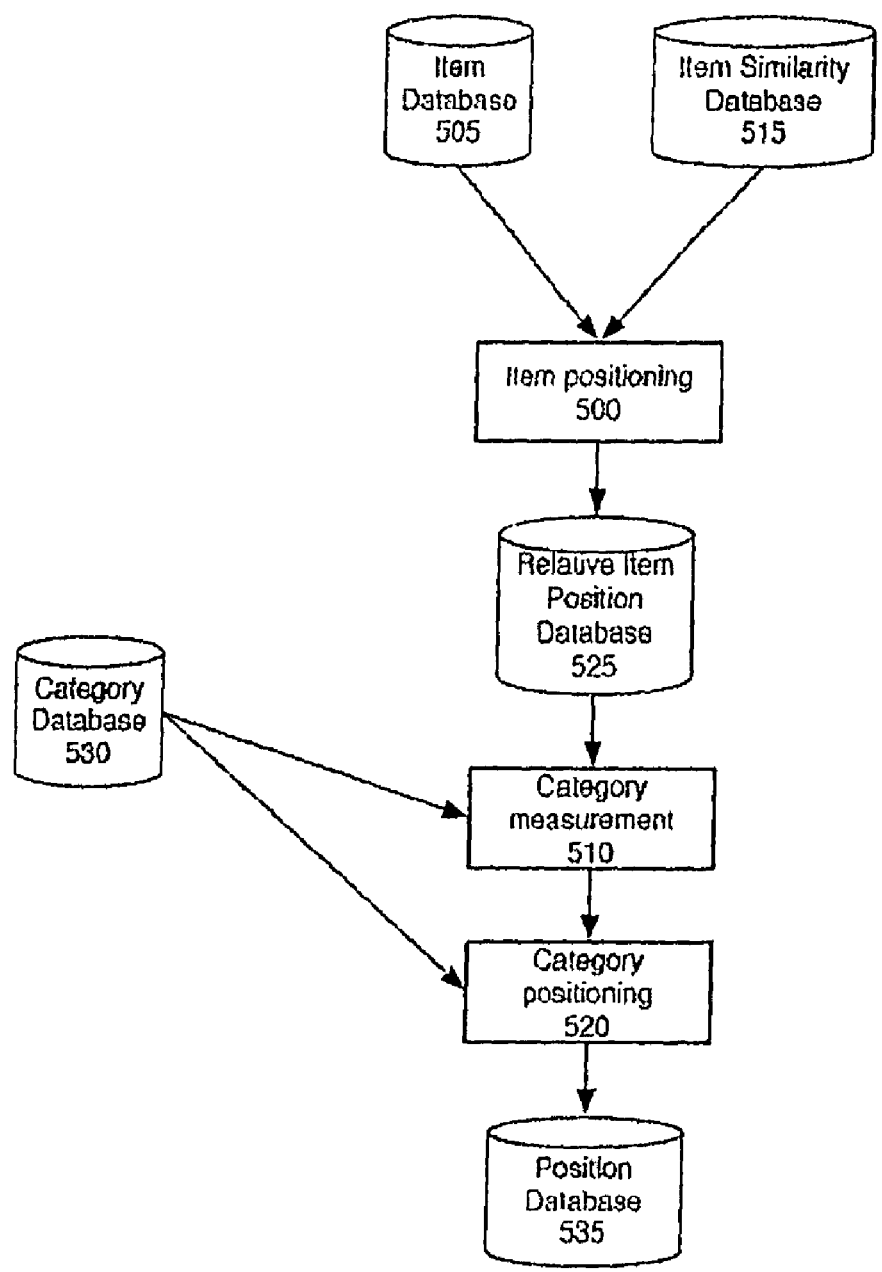
FIG. 5 is a block diagram of the catalog layout process of an embodiment of the present invention.

FIG. 5 illustrates the catalog layout process. The layout algorithms (item positioning and category positioning) compute a position for each item and category. The item positioning step 500 computes and stores a position 525 for each item relative to the position of its category. The category measurement step 510 uses the positions 525 in the category to compute a width and a height for each leaf category (category that does not contain other categories). The category arrangement step 520 uses these widths and heights to compute positions for each category, and widths and heights for each non-leaf category, stored in position database 535.

In the catalog layout process, the layout algorithms create a series of display levels, each with its own scale factor. Each display level specifies the position and size of the items, categories, and various labels and annotations at that specified scale factor. These display levels are related in that an object's position and size is approximately the same between levels, taking into account the difference in scale factors. (For example, an object that is positioned at (100, 200) at a level with scale factor 1.0 will be positioned close to (10, 20) at a level with scale factor 0.1, and its bounding box will be similarly smaller.) Each display level is therefore an approximation of a linear transformation of every other display level. It is only an approximation, however, as some information may be present at some levels and not others (some items are only shown when their features are sufficiently large); items may be represented differently at different levels; and decorations such as text and borders may not be scaled, or are not scaled linearly.

Each item is assigned a visual representation and a spatial position within a "ground-level" view of the data. The spatial position is determined by information about the attributes of the item that is stored in the item database 505, and its similarity to other items is read from the item similarity database 515. In the preferred embodiment, these attributes include its brand and price. Similarly, each category is assigned a spatial position and size with the ground-level view.

The positioning is done in two steps. The first step positions all of the products relative to the origin of the product's category. The second step positions all of the categories. It works its way up from the leaves of the category tree to the root.

The item positioning step 500 uses the grid fill layout algorithm to position the items at the leaves of the category tree. The input is the item similarity database 515, a symmetric matrix M that measures, for each two items p1 and p2, the similarity of p1 and p2. The output is a contiguous subset of an infinite grid, where the items are placed on the grid such that more similar items are closer together.

There are two parts to the algorithm. The selection algorithm determines the order in which items are selected for placement into the layout. The placement algorithm selects a position for each item that is placed into the layout.

For selection, the first item placed in the layout is the product that is most similar to the greatest number of other products. (This is the product n that maximizes M[n,*].) Each successive item is the product that is most similar to those that have already been placed in the layout. (This is the item n that maximizes M'[n, *], where M'[i,j] is a matrix that is identical to M[i,j] for those values of i and j such that either item i or item j has been placed in the layout, and is equal to zero elsewhere.)

The selected items are placed in order according to the preceding algorithm. The position of each item is selected as follows. Let the fringe of a layout be the set of empty positions that are adjacent to a nonempty position. The first item is placed at an arbitrary location. (It doesn't matter where, since subsequent products are placed relative to it.) Each subsequent item Pn is placed at the fringe position that is closest to the items that are most similar to Pn. Formally, this is the position pos that maximizes the sum of {M[i,n]/distance(pos, pos[i])|i<-0 . . . n-1}.

This algorithm minimizes the distance between those items that are most similar to each other (since they are placed first), at the expense of items that are not as similar to other products. The last items may not be placed very near to items that they are similar to, since those products may have been placed near to the center of the grid (far from the fringe). The center is therefore likely to consist of the most similar products, with the periphery filled with products that are dissimilar to each other.

In an extension, this algorithm could also be used to layout larger groups, based on the similarity between groups.

In another extension, items from outside the category could be included among the items in a category, either by providing these items in the input set to the item layout algorithm, or by placing them between other items. This can be used to show related items.

For each category in the category database 530 that contains items, the category measurement step 510 assigns to each leaf category a width and height, that are computed from the positions that the item positioning step 500 assigns to the items, together with the dimensions of these items.

The inputs to the category positioning step 520 are a category hierarchy 530, and a width and a height (an extent) for each leaf category in the hierarchy. ("Category hierarchy" and "leaf category" are defined below.) The output of the algorithm is the assignment, to each category in the category hierarchy, of a position (a point in space) and an extent store in the position database 535. (The output extent of a leaf category is the same as its input extent. The output extent of a non-leaf category is not present in the input.)

The algorithm is recursive from the leaves. Each leaf is assigned an extent. Every other category is initially without an extent. A category whose children have all been assigned extents is assigned an extent as described below. (Since there are no cycles in the "parent" graph, and since all leaves have extents, this is always possible unless all categories have already been assigned extents.) In the process, these children are assigned relative positions. This process is repeated until an extent has been assigned to the root (at which point one will have been assigned to every category). At this point, the root is assigned the absolute position (0, 0), and each child is recursively assigned the absolute position of its parent's absolute position, plus its own relative position.

A number of data structures are used: category hierarchy, rectangle, frontier and region.

A category hierarchy is a hierarchical arrangement of categories. Each category has zero or more children; each category except the root has a unique parent. A category without children is a leaf category.

A rectangle has a position and an extent (a width and height). If the position is (x0, y0) and the extent is (w, h), the rectangle represents the points {(x, y)|x<-[x0, x0+w], y<-[y0, y0+h]}.

A frontier represents a set of y values: one for each x value within an interval of x values. This is equivalent to a function from x to y, but the frontier data type additionally supports operations, listed below, to query, modify, and combine frontiers. A frontier is formally equivalent to a total function from the interval [x0, x1] to the real numbers, but is maintained in a data structure that makes certain operations computationally simpler. This function will be called a frontier's function.

Figure 13:
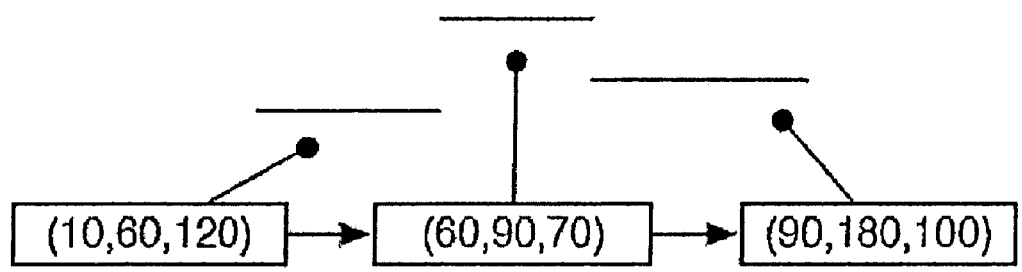
FIG. 13 is a diagram illustrating the frontier data structure of an embodiment of the present invention.

FIG. 13 illustrates the frontier data structure. A frontier is represented as a sequence of spans (x0, x1, y), where the span (x0, x1, y) represents that x values in the interval [x0, x1) are mapped to the y value y. The final span in the sequence represents the closed interval [x0, x1] rather than the half-open interval [x0, x1). Frontiers are useful for representing the composition of horizontal line segments as in FIG. 13. Two invariants of the frontier are that for any two consecutive spans (x0, x1, y0) and (x2, x3, y1) in its sequence of spans, x1=x2 and y0/=y1. The first constraint assures that for any value x within the interval's domain, the collection of spans defines exactly one value y. The second constraint assures that the intervals are stored in normal form: that there is only one way to represent a given function with spans.

The left edge of a frontier is the x0 value of its left span. The right edge of a frontier is the x1 value of its right span. These correspond to the bounds x0 and x1 of the frontier's domain [x0, x1].

The transitions of a frontier are the values of x such that x occurs as the x0 or x1 value of a span (x0, x0, y). These are the values x for which the frontier function f returns a different value for f(x) and for f(x+e) or f(x−e) for some small value e, plus the bounds of the frontier's domain.

A region represents a set of contiguous points on the plane, corresponding to the intuitive notions of a shape, or an area of space. In this embodiment, a region is simply connected: it is a single piece, without holes. The region data type supports operations to find flat edges along the sides of a region, and to extend a region in any direction so that it contains a rectangle outside the region. (This extension is not a simple union, because this would not in general be simply connected.)

Figure 13B:
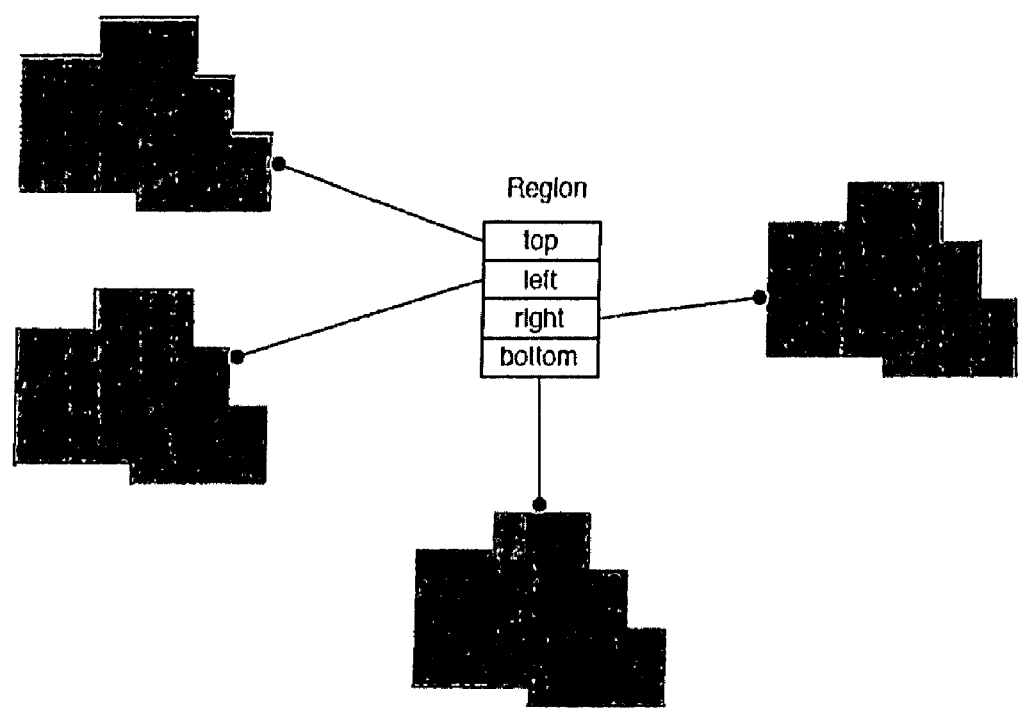
FIG. 13b is a diagram illustrating the region data structure of an embodiment of the present invention.

Formally, a region represents a compact simply-connected 2-manifold within $R^2$: a set of points in the plane, simply connected, without holes. FIG. 13b illustrates the data structure for a region. A region is represented by a composition of four frontiers, that represent the top, bottom, left, and right sides of the region: the minimal and maximal value of y that intersect each vertical line within x, and conversely for x and y. The left and right frontiers represent function from y−>x, so where the definition of a frontier refers to x and y respectively, these coordinates of a frontier that is used as the left or right frontier of a region represent the region's y and x coordinates, respectively.

A region is extended above to include a rectangle by modifying its top frontier such that the value of the new top is the same, at each x position, as the value of the old top, except that where x lies between the left and right sides of the rectangle the value of the new frontier at x is the less of the value of the old frontier at x, and the y position of the rectangle's top. An analogous definition can be created for extended below, extended left, and extended right.

A region is extended to include a rectangle by extending it above, below, left, and right to include this rectangle. The extent of a region is the pair of its width and height. Its height is the greatest y value of its bottom minus the smallest y value of its top frontier. A similar calculation is done for its width using the left and right frontiers.

The algorithm is a follows. A category's children are positioned so that the children do not overlap. It is not always possible to place all of the children without having gaps and other wasted space. The children could be positioned in such a way as to make the parent very tall and narrow or very wide and short. Neither of these are desirable. The algorithm is designed to pack the children tightly while simultaneously keeping the parent roughly square. Other aspect ratios (e.g. the golden mean) are also possible.

The inputs to the algorithm are a set of categories (the "children"), and an extent (a width and height) for each child. The output is a provisional position for each child and the extent of the parent. While positioning a category's children, a region, as defined above, is used by the algorithm to collect the area that has already been allocated. When all of the children have been positioned and collected, the extent of the resulting region is used as the extent of the category.

Figure 14:
FIG. 14 is a diagram illustrating part 1 of an example of carrying out the category layout process on a sample set of regions.
Figure 14:
Figure 14:
Figure 14:
Figure 14:
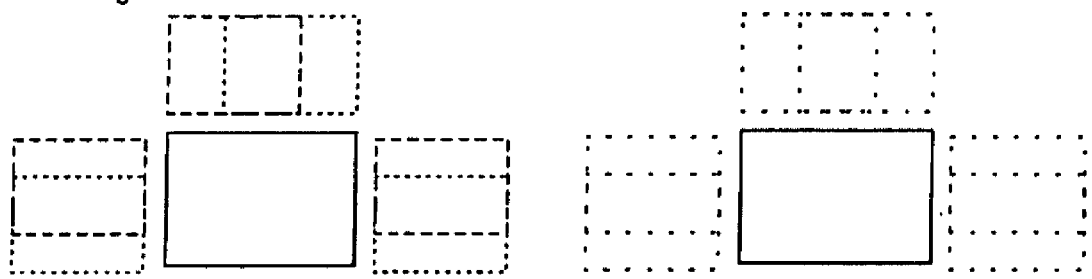
Figure 14:
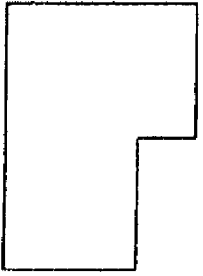
Figure 15:
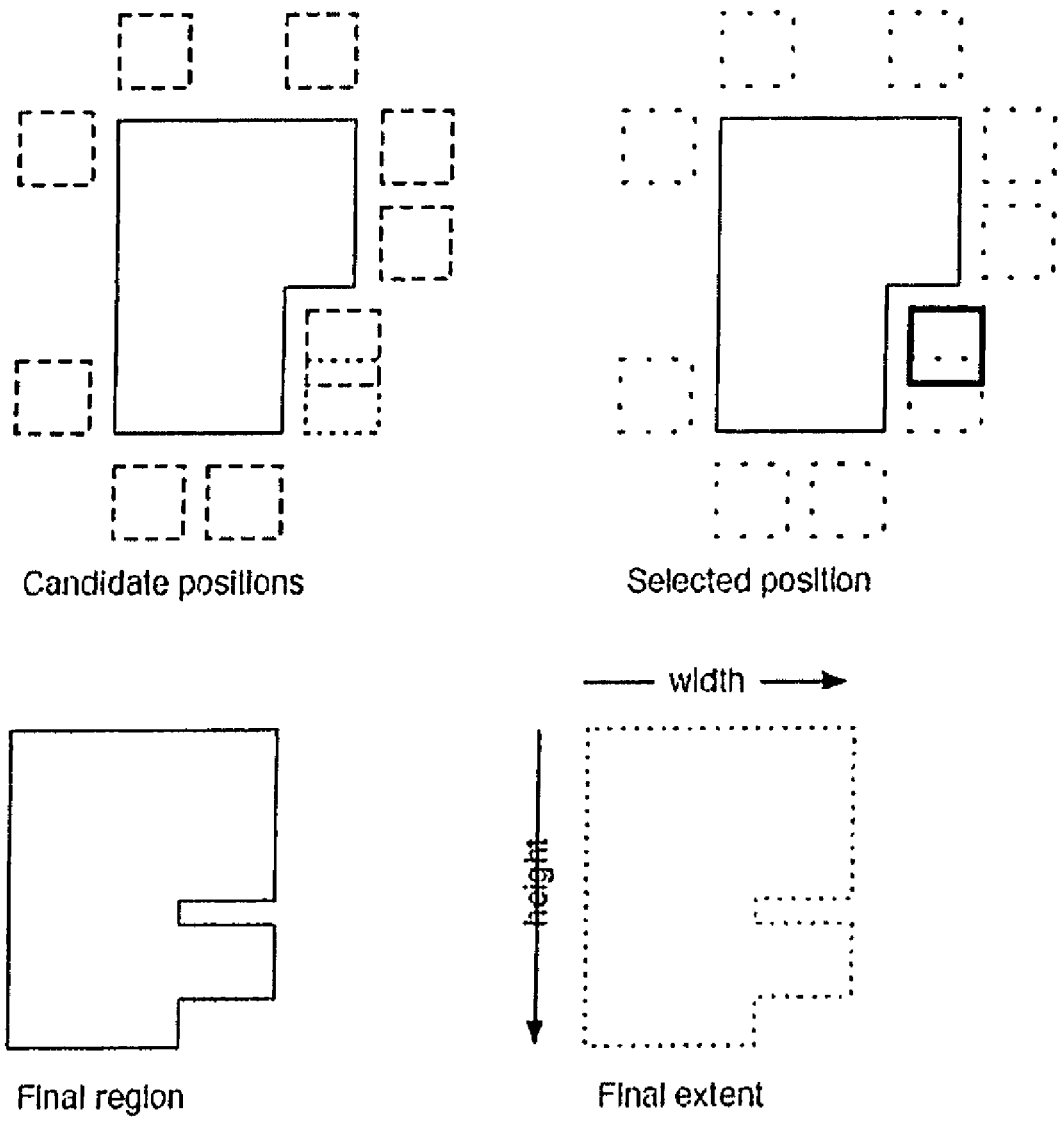
FIG. 15 is a diagram illustrating part 2 of an example of carrying out the category layout process on a sample set of regions.

FIG. 14 and FIG. 15 illustrate the category layout algorithm. When processing a category 1410, its children are first sorted by area 1420 where the area of a child is the product of its width and height. The initial region 1430 is the region that represents the rectangle with origin (0, 0) and whose extent is the extent of the first child. This initial region becomes the current region and then each succeeding child is processed.

For each child, a series of candidate positions 1440 are generated. For each candidate position, a candidate region is generated by extending the current region by the rectangle defined by the candidate position and by the child's extent. The candidate regions are then evaluated against an evaluation function. The candidate region that yields the least value becomes the new current region 1460. The corresponding candidate position 1450 becomes the relative position of the child. The positioning continues for each remaining child as illustrated in FIG. 15.

In more detail, the candidate positions are as follows:
For each transition x along the current region's top frontier, the candidate position is (x, y0−m− height)
For each transition x along the current region's top frontier, the candidate position is (x−m− width, y1−m− height)
For each transition x along the current region's bottom frontier, the candidate position is (x, y2+m+ height)
For each transition x along the current region's bottom frontier, the candidate position is (x−m− width, y3+m+ height)
For each transition y along the current region's left frontier, the candidate position is (x0−m− width, y)
For each transition y along the current region's left frontier, the candidate position is (x1−m− width, y1−m− height)
For each transition y along the current region's right frontier, the candidate position is (x2+m+ width, y)
For each transition y along the current region's right frontier, the candidate position is (x3+m+ width, y−m− height)
where:
  width, height are the dimensions of the current child
  m (margin) is the desired space between children
  y0 is the minimum of {ft(y)|y<−[x, x+ width]}
  y1 is the minimum of {ft(y)|y<−[x-width, x]}
  y2 is the maximum of {fb(y)|y<−[x, x+width]}
  y3 is the maximum of {fb(y)|y<−[x-width, x]}
  ft is the function of the current region's top frontier
  fb is the function of the current region's bottom frontier
  and similarly for x0 through x3.

In the preferred embodiment, the evaluation function takes a region with extent (width, height) to the value width+height. This maximizes the "square-ness" of the region (which also minimizes the amount of wasted space). Alternatives are the functions max/min, where max is the larger of width and height and min is the smaller; or max/ratio/min or max/ratio+min, where ratio is an aspect ratio such as the golden mean.

When all children have been positioned, the category is assigned an extent that is the extent of the current region.

In alternative embodiments of the invention, the position of items in the category and positions of categories themselves may be based certain business purposes. For instance, a particular merchant, manufacturer, supplier etc. may pay a premium to have their products preferentially placed—perhaps in the center of a category, in a separate category, a special category (such as luxury items or brand boutique.)

Icon Image Selection Process

Figure 19:
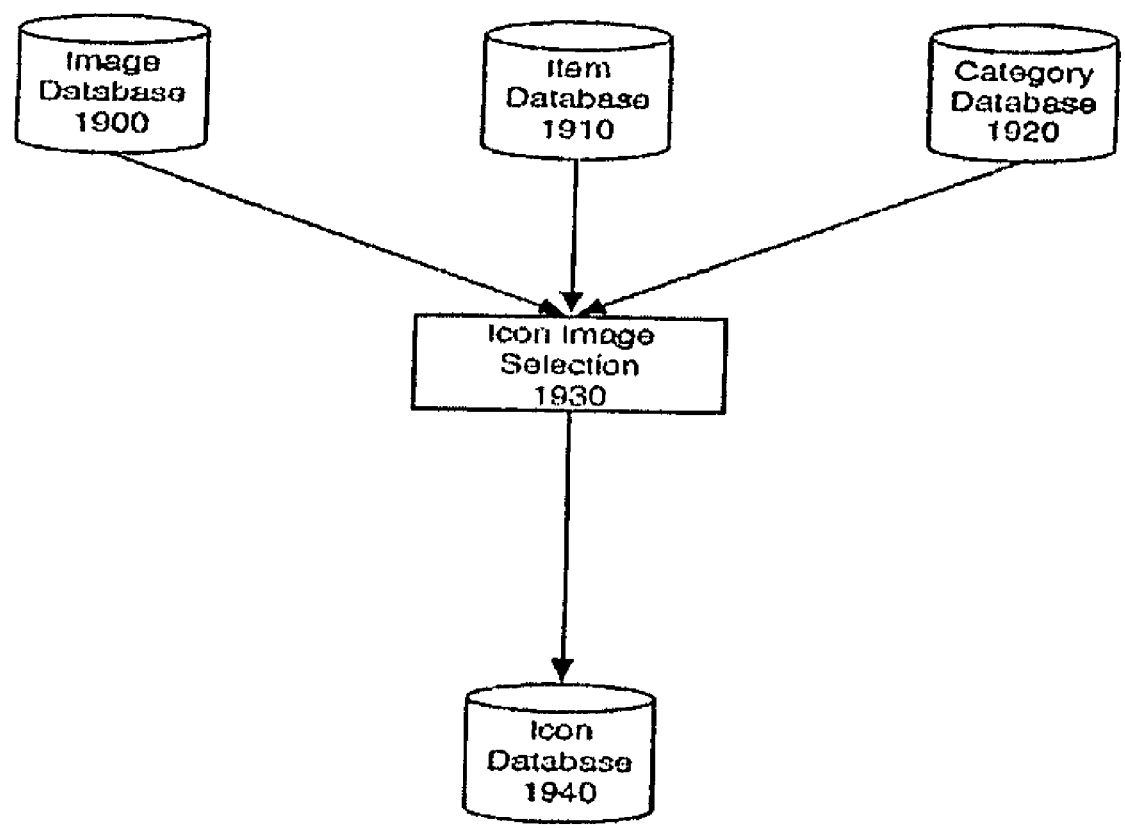
FIG. 19 is a block diagram illustrating the steps in the icon image selection process of an embodiment of the present invention.

The categories are shown on the catalog display using a combination of filled shapes, text labels, icons and graphical elements. The Icon Image Selection process 235 of FIG. 2 is designed to select an image for each category that is visually representative of the products in that category. This process is illustrated in FIG. 19 and has only one step 1930 the result of which is an icon for each category stored in the icon database 1940.

The product categories are organized as a tree with the most general category for a given store at the root (e.g. Shoes) and the most specific categories at the leaves (e.g. Women's Golf Shoes). The tree is stored in the category database 1920. The relationship between a product and the categories it is in is represented by records in the product categories table which is part of the item database 1910. Only leaf categories have directly associated products. The non-leaf category "Women's Shoes" has no products directly associated with the category. While there are many women's shoes they are all stored associated within the leaves of category tree below women's shoes.

The algorithm for selecting an icon is recursive and depth first on the category tree. It selects a product from a category with an image that will work well as an icon for that category.

The process first applies the same selection process to all of the child categories of the current category. For leaf categories, there are no child categories and the process applies a separate child category algorithm described below. For non-leaf categories the icon image is selected from among the icon images of the direct child categories. The direct child categories are iterated over and the icon image selection process is applied to each child in turn. This results in the product with the best image for the child category. As the algorithm iterates it computes the best child icon from the set of selections for the child categories. When the iteration completes this is returned as the icon image for the category. Best can be determined in many different ways, for example, the best icon may be the one that is most popular i.e. has the lowest sales rank.

The algorithm for leaf categories selects the best product from among the products in the category. In the preferred embodiment it relies on several pieces of information stored in the item database:

the product's sales rank, which is stored in a column in each product record in the products table of item database 1910.

the sale price of the product another column in the products table of the item database 1910 the product categories table page of the item database 1910, which stores the relationship between products and categories and is used to determine how many categories a product is in The process also relies on simple image processing of the product images to identify those product images that have white backgrounds. The images are stored in the image database 1900.

For leaf categories, the product is selected from products in the category as follows:

First, using the a database query select the highest sales ranked ten products that have large images, are in this category and in no other category and are not on sale. Then test these products in order of decreasing sales rank (from most popular to least) checking for one that has white in all four corners. Return the first one found.

If the previous method did not find a product meeting all of the criteria, we relax the constraint of not on sale and allow products that are on sale again checking the top ten for white in all four corners.

If the previous method did not find a product, then we allow products that are in multiple categories again checking the top ten for white in all four corners with an additional check to make sure that this product hasn't already been selected as the prototype by another category.

If the previous method did not find a product, relax the white corners constraint and allow products with non-white corners, but again check each one in turn to ensure that the product was not already selected as the prototype of another category.

If none of the methods above results in a product, then this category does not have an icon and the algorithm returns NULL.

The algorithm for checking for white in all four corners relies on RMagick, a library that integrates GraphicsMagick (www.graphicsmagick.org) into the Ruby programming language (www.ruby-lang.org). The product image is loaded into memory from where it is cached on the disk and an Rmagick routine is used to get the bounds of the image. Then another RMagick routine is used to access the value of the pixels in each of the four corners. The pixel value in each corner is compared to the value for the color white. If all match, then True is returned, otherwise False.

In an alternative embodiment, the icons could be drawn or selected by hand from the images of the products in this category. In another embodiment, the icons would not be product images from the product catalog, but images from a separate data source such as a stock photo service.

When the algorithmic selection described above is not perfect it can be overridden by a hand selection. If product images are used for icons, they can be used as-is or they can be processed to make them look less like images of actual products and more like generic icons for this type of product. The processing could be done using standard image processing steps such as color reduction, boundary tracing and enhancement.

The icons are product images of various sizes and the images must be scaled to the size specified for the icon. The product images often have a white background. When they are used as icons in the catalog display they are drawn on top of other shapes like text, background colors and very small product images. To make this more visually pleasing any white around the icon image is first removed using GraphicsMagick's trim routine. This crops the image removing areas of all white from each side. Next any white are that cannot be trimmed off is made transparent so that when the icon is drawn the shapes underneath the icon will be visible. The transparency is also done using another GraphicsMagick routine.

Image Creation Process

Figure 6:
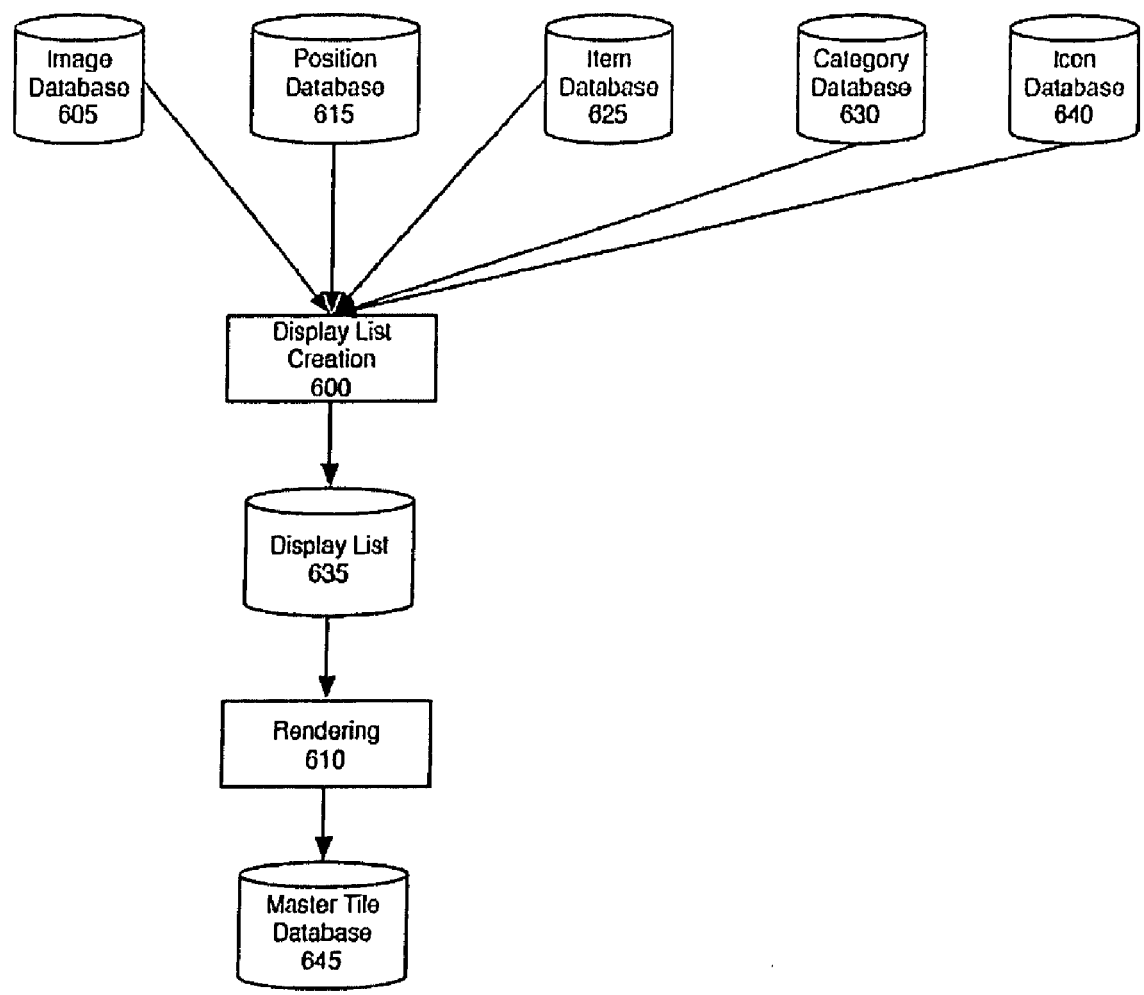
FIG. 6 is a block diagram of the image creation process of an embodiment of the present invention.

FIG. 6 illustrates the image creation process. The display list creation step 600 creates a list of shapes that are used to create multiple image files. The rendering step 610 creates a set of image files from the display list.

After positions have been assigned to each item and category, and after icons representing each item and category have been selected, the system constructs a series of display lists 635, one for each display level. The display list is a list of objects that represent the shapes that are used to represent each item, category, label, or stylistic adornment, in the catalog display. As described in the section that follows this one, the display list for a level is used as an input to the rendering step 610: the rendering step is applied to the display list repeatedly, each time with a different bounding box, to create the image tiles for that level 645.

The inputs to the display list creation step are the category and item positions 615, the information in the item database 625, a style specification, and the scale factor and index of the level whose display list is created. The step 600 uses this information to build a display list 635, and a list of category label and icon display regions. The display list 635 is used to render 610 the master tiles 645. The category label and icon display regions are used to create the level-specific data that is described in the section on the data creation process, below. Formally, the display list can be considered to specify the bounds (width and height) of the display area, a map from pixel coordinates to colors.

Figure 21:
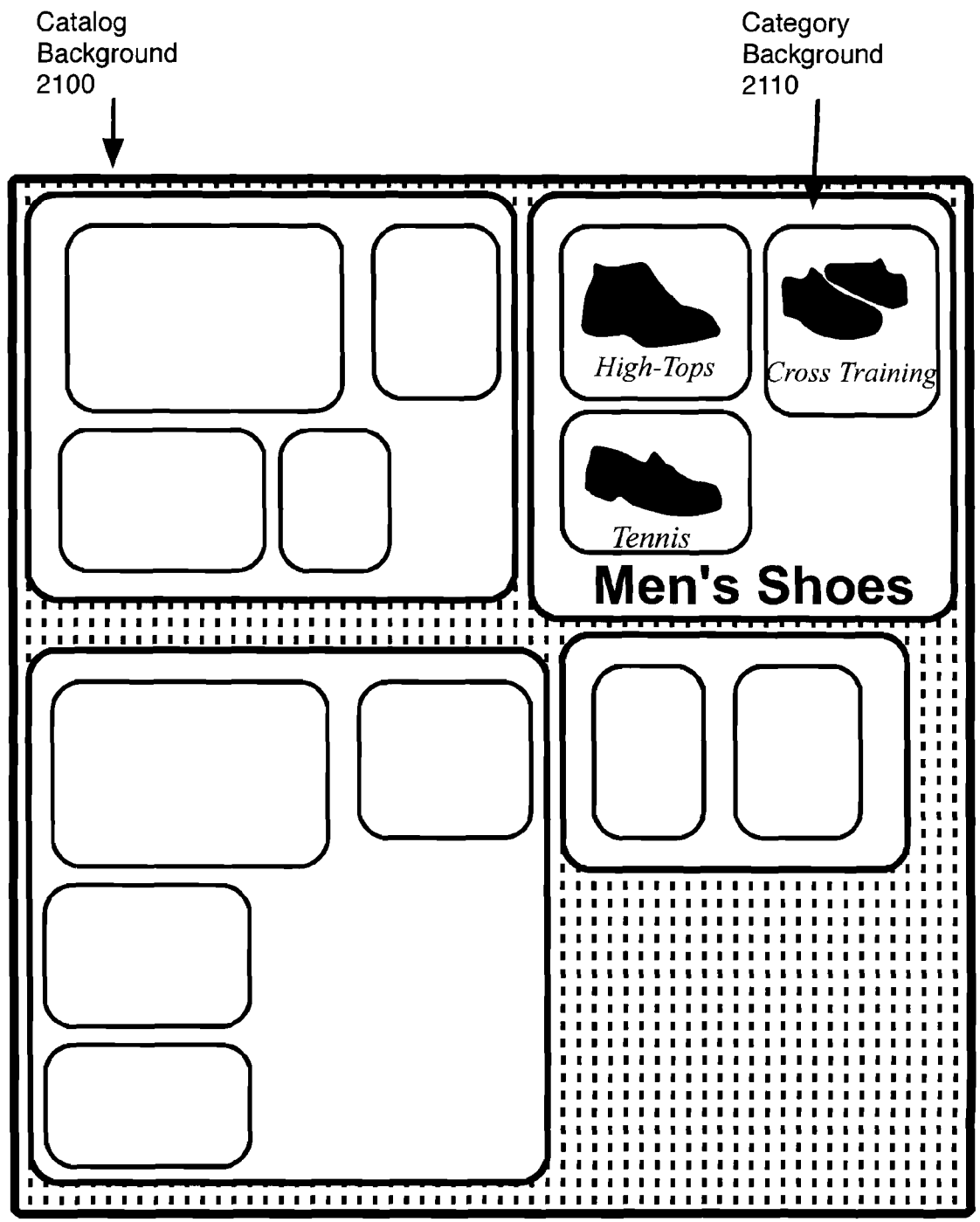
FIG. 21 is an illustration of the catalog display in an embodiment of the present invention.
Figure 22:
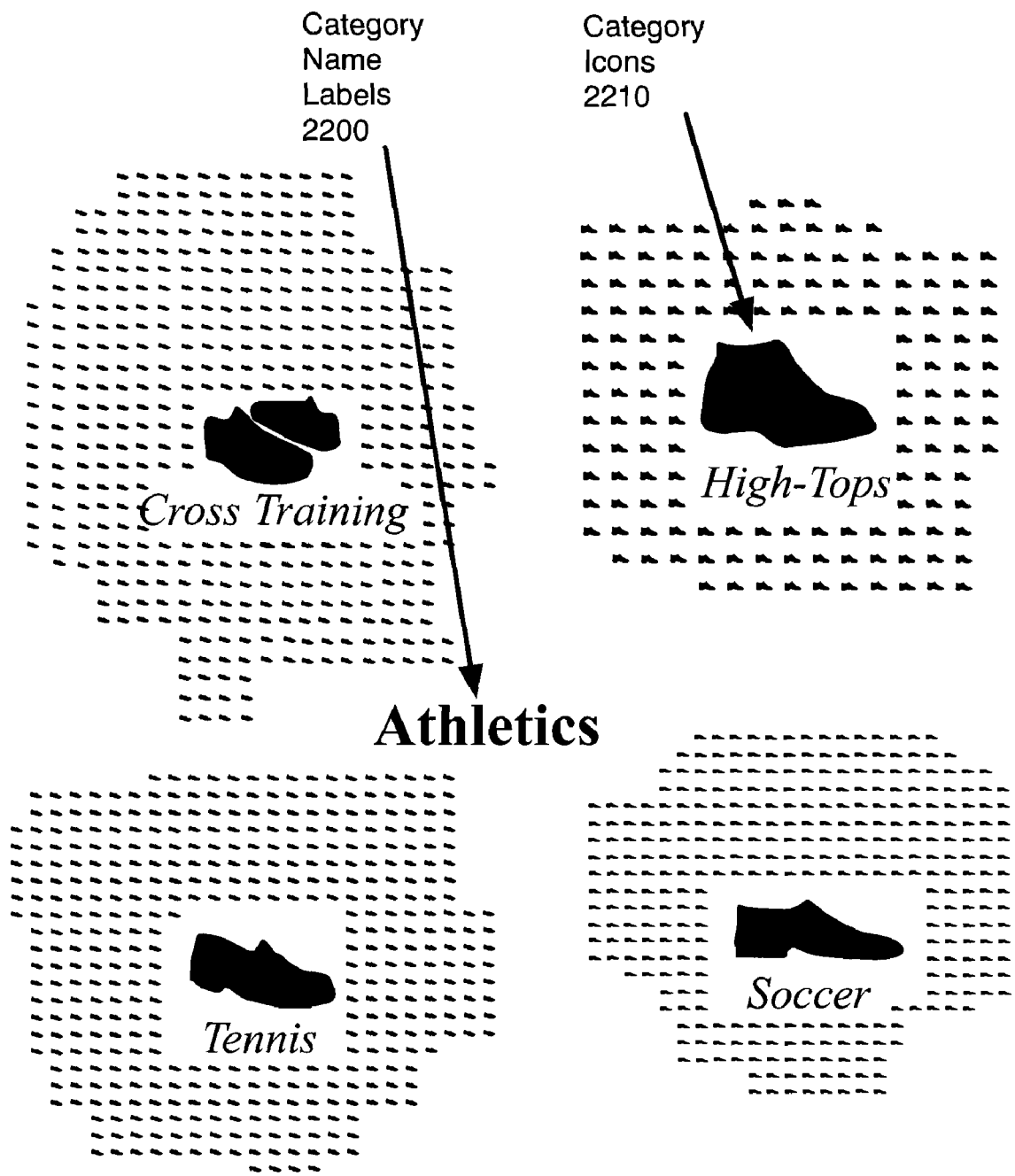
FIG. 22 is an illustration of the category labels and icons as displayed in an embodiment of the present invention.
Figure 23:
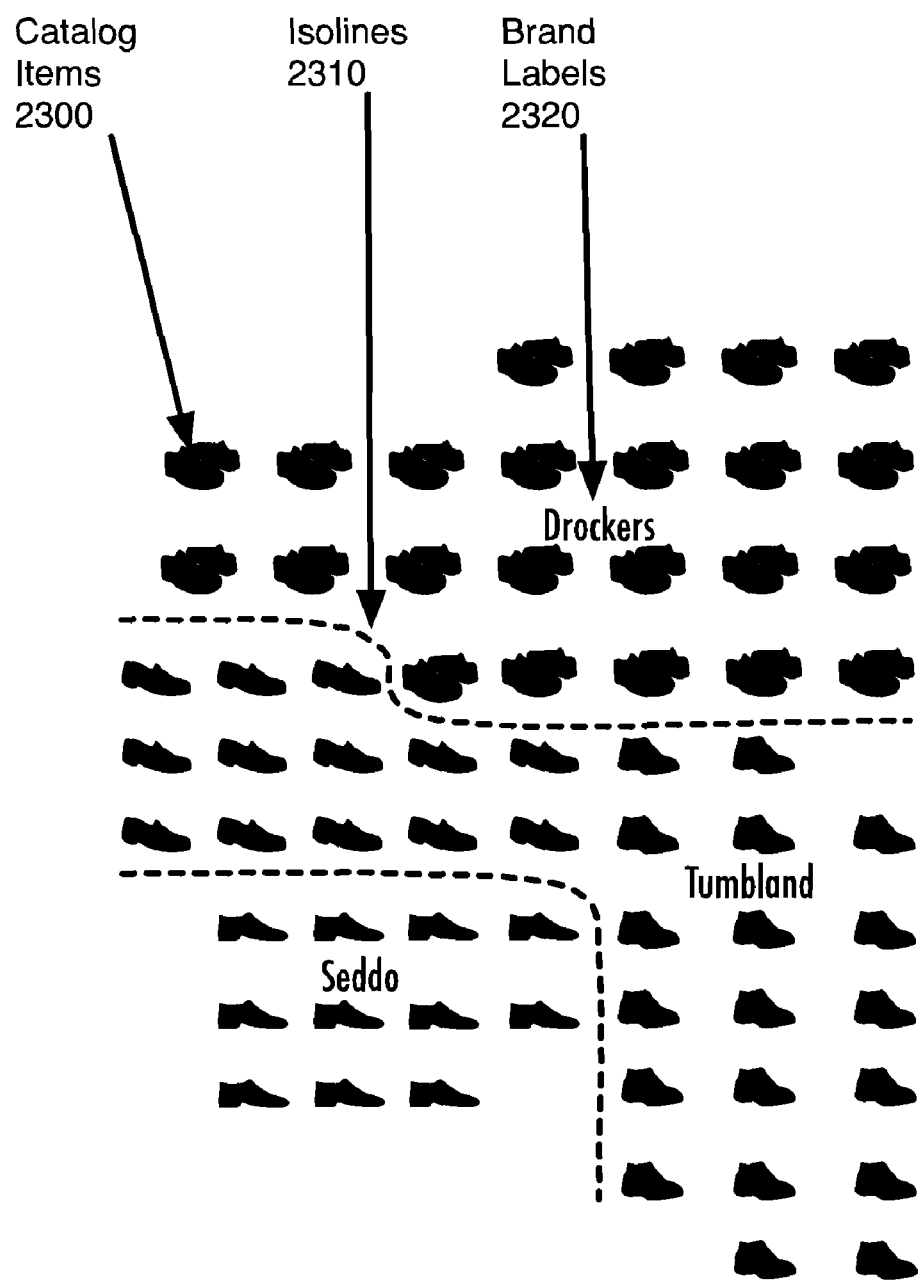
FIG. 23 is an illustration of the brand labels and isolines as displayed in an embodiment of the present invention.

The display list creation step consists of these functions, each of which is described in more detail below. FIGS. 21, 22 and 23 illustrate various display levels of a catalog display. First, with reference to FIG. 21, shapes that represent background of the catalog display 2100 is added to the display list. Second, shapes that represent the background of each category, for instance 2110, are added in a depth first traversal of the category tree. Third, turning to FIG. 23 illustrating a more detailed example of a display illustrating details of a category, shapes that represent the contents of select categories are added: these shapes are the images that represent catalog items 2300, and paths 2310, called isolines, that visually separate items in the same category with different brands. Finally, shapes that represent the foreground of each category are added; these include a brand label 2320, and with reference to FIG. 22, a label 2200 that contains the name of the category as well as a border and background shape for this label, and an icon that represents the content of the category 2210.

A display list is represented by a list of shapes. A shape represents a rendering operation; the rendering step (below) iterates over the shapes in the display list, and uses the information in the shape and its style to determine how to change the rendering surface. A shape has a position, a style, and additional information that depends on the type of shape. A shape is one of a rounded rectangle shape, a text shape, an image shape, a path shape, or a shape group. An image shape contains, in addition to its position, the path to a file that contains a bitmap image, and a width and height. A text shape contains, in addition to its position, a string. A path shape contains a sequence of segments; each segment is a line, a quadratic bezier, a cubic bezier, or an arc. A shape group contains a set of shapes, or a reference to a function that can compute these shapes when they are required.

A shape's style specifies the color and opacity of its boundary, the color and opacity of its interior, and the stroke thickness and dashing parameters of its boundary. A text shape's style additionally specifies the font family, style, weight, and point size of the shape's text.

An extended style is a list of effects and styles that can be applied to a shape to create a set of shapes. These effects include: adding a drop-shadow behind the shape; adding a rounded rectangle behind the shape; add, adding a halo around the shape. A drop-shadow consists of a relative offset, a blur factor, and an opacity. A rounded rectangle consists of a rounding value, a style for the background, and a style for the border. A halo consists of a width, a color, a central width, a halo width, a central opacity, and an edge opacity. The effect of adding a shape with an extended style to the display list is to apply the effects to the shape, and to add the resulting shapes to the display list.

A category style specification specifies how a category is displayed. It is a data structure that contains these fields:
  A boolean value that specifies whether the category is displayed at all.
  Boolean values that specifies whether the category's background, name, exemplar, and items are displayed.
  Boolean values that specifies whether brand and price lines are displayed between the categories icons.
  The corner radius and extended style of the category background and border.
  The extended style of the category's title.
  The extended styles of the brand and price labels.

The catalog display style specification is a data structure that specifies the extended style of the catalog display background, maximum width and height for an item's icon, the horizontal and vertical spacing to use for the grid that contains a set of items in a category, and a set of category style specifications indexed by the display level index, the depth of the category in the category hierarchy, and boolean values that represents whether the category directly contains items, and whether it contains child categories.

For example, the ground level catalog display (the display level with scale factor 1.0) has level index 0. The next-largest level might have a scale factor of 1.5 or 2.0, depending on the design of the catalog display, but in either case it has a display level index of 1. The inclusion of the display level index within the keys to the catalog style specification allows the algorithm to add shapes that display a category with visual characteristics (for example, different font sizes, or the presence of absence of different information) that differ at different display levels. The inclusion of a number that represents the depth of the category in the category hierarchy allows the algorithm to display the labels of categories near the root (e.g. women's shoes) in a large type size than categories that are further down the tree (e.g. women's ballet shoes). The algorithm chooses a category display style based both on the display level index and the category depth. For example, the icon for Women's shoes (at category node depth of 1) may be displayed when at display level number 9, but may disappear at display level 3.

The construction of a display catalog includes the construction of multiple sets of image tiles, one per display level. The construction of the image tiles for a level consists of the creation of a display list for that level (this section), followed by a process of rendering it (a following section). The algorithm that creates a display list for a level has these inputs:
  the index of the display level
  the scale factor of the level
  the item positions computed by the item layout algorithm
  the category positions created by the category layout algorithm
  the images in the image database
  the records in the item database
  a layout style specification The output consists of a list of shapes, and a set of structures each of which consists of a category id and a region.

The algorithm for display list creation is as follows. First, for each level the display list begins empty. Second, the bounding box of the categories and items is determined, a rectangle shape with these bounds, and with the extended style specified in the display catalog style specification, is added to the display list. Third, for each category, a rectangle shape whose bounds are the bounds of the category, and whose extended style is the style specified for that category in the display catalog style specification, is added to the display list. Fourth, for those categories whose catalog style specifications specify that the category items are visible, shapes that represent these category items are added to the display list. (This process is described in the following section, "adding category item shapes".) Fifth and finally, for each category whose catalog style specification specifies that its label or exemplar icon is visible, shapes that represent these labels and exemplar icons are added to the display list.

Steps three through five are each performed in prefix order: the shapes that pertain to a category and that are added by step three are added to the display list before the steps that pertain to its children, and similarly for step four, and step five. Step three is applied to all categories before step four is applied to any category, and similarly for steps four and five.

The category style specification for a category is the category style specification that is indexed by the display level, and by the attributes of the category as specified in the description of the display catalog style specification.

For each category label shape or category icon shape that is added to the display list, a record is added to the list of category label locations, consisting of the category id and the display region of the shape.

With reference to FIG. 23, shapes that represent the items in a category are added to the display list as follows. First, for each item in the category, an image shape whose image source is the canonical image associated with the item 2300, whose position is the position associated with the item in the position database, and whose size is the size specified in the catalog display specification, scaled by the display level's scale factor, is added to the display list. Second, a set of path shapes representing isolines 2310 are added the display list, as described below. Finally, if the category specification specifies the presence of brand labels, then for each brand in the category, a text shape 2320, whose extended style is the style specified in the category specification, is added to the display list.

The position of a brand label is as follows. First, the center of gravity of the items in the brand set is calculated. The x (or y) value of the center of gravity is the average of the x (or y) values of the display regions of the items. Second, the y value of this center of gravity is rounded to the nearest multiple of the vertical grid spacing. (The x value is left unchanged) Third, a fraction of the vertical grid spacing is added to the y value, to create a final center position. These operations compute a position that is aligned to the grid, and is offset between rows of the grid. The label is positioned such that its center coincides with the final center position.

As described above, after the shapes that represent items within a category have been added to the display list, and before the shapes that represent brand labels have been added, shapes that represent isolines are added to the display list.

The item positioning step, above, assigns positions to the items within a category such that items with the same brand are contiguous, as illustrated in FIG. 23. Within a category, each set of items with the same brand is a brand set, and the spatial region that contains items in a brand set is a brand region. The brand regions may also be separated by isolines 2310. These are lines that are drawn along the borders of brand regions, to separate one region from another.

Isolines are constructed by collecting short horizontal and vertical line segments; connecting these line segments at their end points to form longer rectilinear paths; and smoothing these paths. (A rectilinear path is a connected path consisting only of horizontal and vertical segments.) The horizontal and vertical line segments are those that separate the display region of an item in one brand set from the display regions of any neighbors that belong to different brand sets.

The joining algorithm constructs a set of paths by choosing a line segment, finding other line segments that share an endpoint with the initial line segment, finding other line segments that share a different endpoint with each of these, and continuing until it has exhausted the set of line segments that can be attached to this path; then it repeats with the next unused line segment to create another path, and so on until all the line segments have been exhausted.

The smoothing algorithm displaces each corner towards the line that connects its neighboring corners, and then uses this new path P1 (which is constructed only of line segments, but which is no longer in general rectilinear) as a guide for constructing a further path P2 that consists both of line segments and quadratic bezier curves. The off-curve control points of P2 are the corners of P1, and the on-curve points of P2 are points of P1 slightly forward and backwards from each corner.

The background and border of a category may be rendered as a path instead of a rounded rectangle. The path is computed by computing the region that includes the category's children. This region is the closure of the regions corresponding to the children's regions, under the extension operation defined in the definition of the region datatype. The path that corresponds to this region is the concatenation of the region's top, right, bottom, and left frontiers, outset from the region center, and smoothed as specified in the description of the algorithm for "Adding isoline shapes".

In alternative embodiments of the invention, the display of items and categories may be based certain business purposes. For instance, a particular merchant, manufacturer, supplier etc. may pay a premium to have their products displayed in a distinct and prominent way—perhaps in the images may be larger, the background color different, displayed first, etc. Additional information may be collected for these items and categories such that user interactions result in the display of the additional information or display of the usual information in a distinctive way. This can be similar to yellow-page style of business where for additional charges certain highlighting is provided.

The next step in the image creation process of FIG. 6 is the rendering step 610 which must account for multiple levels in the generation of the tiles for the display. For each level, the rendering step starts with the display list 635 and constructs a set of bitmap images ("tiles") 645 at various (x, y) offsets for that level. Thus, a tile at offset (x0, y0) and with dimensions width and height will include the pixels (x, y) where x0<=x<x0+width and y0<=y<y0+height.

The rendering step utilizes the Cairo graphics library (http://cairographics.org/) for constructing image files. This library is capable of allocating memory (an "image buffer"); of operating upon a description of the geometry of a path, region, or text shape and stylistic information that describes its color, opacity, stroke, interior, text, and font characteristics, in order to effect the pixels within the allocated memory in accordance with these descriptions; and of encoding and saving the allocated memory in a standard image file format such as JPEG or PNG.

In rendering the tiles for a level, the inputs are a level index, a display list and the width and height (w, h) for each of the tiles.

For each shape type described in the "shape" data type, there is method for computing the bounding box of that shape. This is the rectangle that includes the coordinates of at least those pixels that the shape represents an effect on.

For each shape type described in the "shape" data type, there is a method for converting the information contained in the shape into a sequence of instructions that direct the graphics library to effect the pixels of an image buffer in accordance with the effect that the shape represents. This method is called rendering the shape. Rendering is relative to a translation factor, that represents the correspondence between the coordinates used in the description of the shape's geometry, and the coordinates that describe pixel offsets into the image buffer. This translation factor can be used to adjust the coordinates that are extracted from the shape's geometry, as they are used to construct the description that is input to the graphics library; or if the graphics library support operations that translate the graphics viewport, this translation can be applied to that viewport.

The algorithm iterates through each shape in the display list, and computes the intersection of the shape's bounding box with the tile bounding box. If the intersection is non-empty, the shape is rendered, with a translation factor of (-x, -y), where (x, y) is the bottom left corner of the tile bounding box.

The preferred embodiment creates a set of "master tiles" that may be later subdivided in the slicing process to transfer to the client. In the preferred embodiment, these master tiles are 1024×1024 pixels.

In an extension of the rendering step, and in conjunction with the extension to the catalog layout process where areas are reserved for items that are updated more frequently, the image creation process may have a mode where it renders only those tiles that contain frequently updated items.

Dataset Creation Process

Figure 6B:
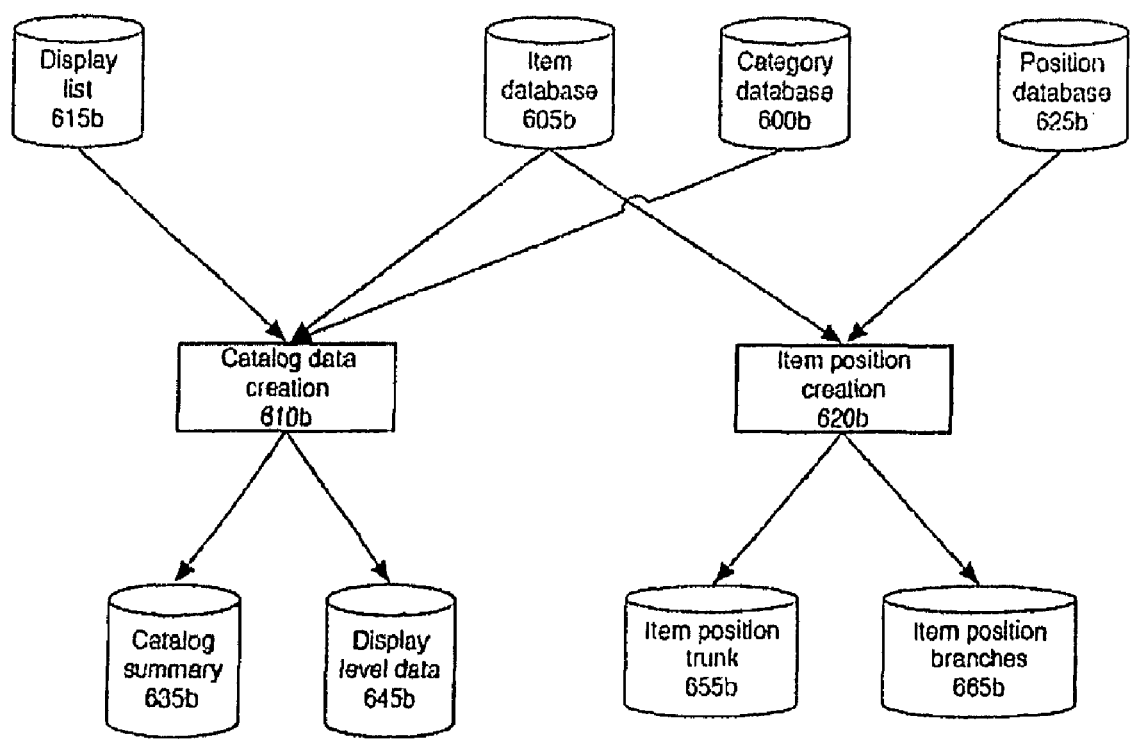
FIG. 6b is a block diagram of the dataset creation process of an embodiment of the present invention.

FIG. 6b illustrates the dataset creation process. The catalog data creation process 610b creates a dataset 635b that summarizes the content of the catalog, and one additional dataset 645b that contains information about each category. The item position creation process 620b generates a set of spatially partitioned datasets 655b and 665b that contain spatial information and attribute information about each item.

The dataset creation process can be run more frequently than the image creation process, if there is data such as sale price or delivery estimates that is not incorporated into the layout or the images, but is made available to the client as part of the data in the dataset repository.

The dataset 645b for a display level consists of the level's bounding box, information about each item—its position, extent, and item metadata—and information about each category—its position and extent, the position and extent of its icon and label, and its name, parent category, and child categories.

Figure 9:
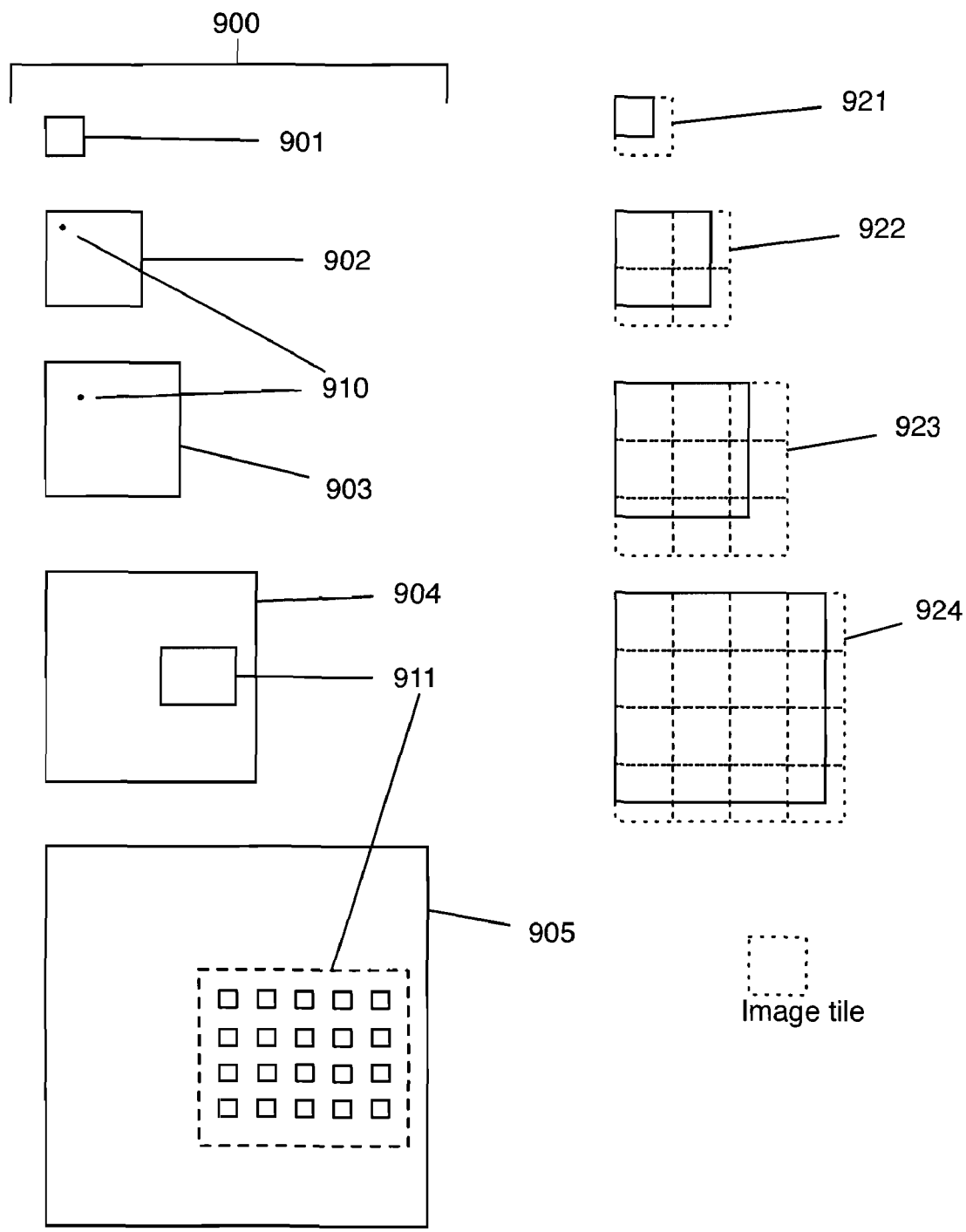
FIG. 9 is a diagram illustrating display levels, image tiles and ground level as used in the an embodiment of the present invention.
Figure 10:
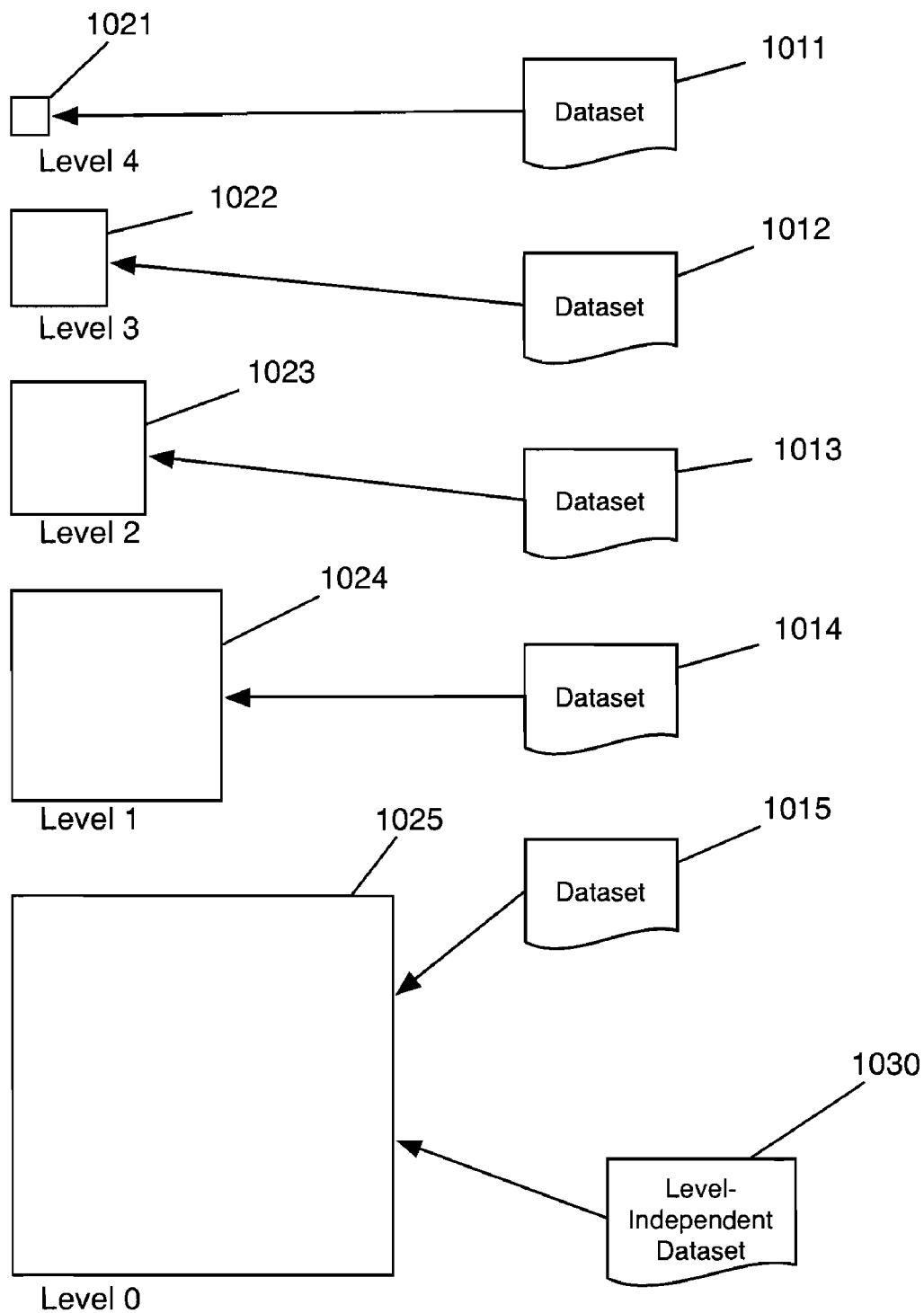
FIG. 10 is a diagram illustrating the level-specific data as used in an embodiment of the present invention.

There are two types of data: level-independent data 635b, 655b, and 665b and level-specific data 645b. Level-independent data contains information that is applicable to every display level: information about non-geometric properties of items and categories, or geometric information that can be computed from a ground-level geometry together with the scale factor for a specific display level. Data that is relevant only to a specific display level is "level-specific data". FIG. 9 illustrates the display levels. A catalog display 900 is represented by series of display levels 901, 902, 903, 904 and 905 at different scales. The same item, for instance 910, can be present at different display levels. In this case, its position at each level is at a constant ratio from the sides of a level's bounds. A set of items, for instance 911, at one display level may be represented by a single item at a level with a smaller scale, or may not be represented at all. The display at the largest scale, here 905, is called the ground level. Each display level is represented by a set of image tiles 921, 922, 923 and 924. FIG. 10 illustrates the distinction between level-specific and level-independent data. As illustrated in FIG. 10, a series of datasets 1011, 1012, 1013, 1014 and 1015 contain information about specific levels of a catalog display 1021, 1022, 1023, 1024 and 1025, respectively, such as the positions of visual items such as text labels or summary images that are only present in some levels, which are described in the datasets that are specific to each level of the catalog display. Information that is applicable to all levels of the catalog display is described in a set of level independent datasets 1030 that can be applied to every level. Where this information contains coordinates, these are ground level coordinates and can be scaled to yield positions within each level.

In the preferred embodiment, the level-independent data consists of information from the category and item databases, together with information about the display regions of catalog items, since the coordinates of an item's display region within a specific display level are a function of its ground-level coordinates and the display level's scale factor. The level-specific data includes information about the position of category labels and icons, since these scale non-linearly.

For each catalog, a set of summary information and detailed information about each category is stored in the dataset repository. The summary and category information are indexed by the id of the catalog.

The summary contains the following fields:
  The ground level's bounding box
  The catalog display's background color
  An image to be used outside the catalog display
  An image to be used while a tile inside the catalog is loading
  A list of representations of categories, indexed by id, where each category representation contains the bounding box of the category at ground level, the name of the category and the id of the category's parent category. The bounding box of the category is referred to below as its display region.

Each category is also represented by a separate set of detailed information about the category. The detailed information is stored separately since the data can be large and each category can be separately loaded. The detailed category information is indexed by the catalog id and the category id and contains the following fields:
  The ids of the category's child categories
  The URL of the category's icon
  The URL of images to use to use as visual examples of the content of the category
  A textual description of the category There is additional level-independent data that is partitioned spatially. The partitioning is done to reduce the amount of data that must be loaded at one time by the client. As will be explained below, the client only will load the portions of the data that correspond to portions of the catalog display that are visible. In the preferred embodiment, product information is partitioned spatially according to the location of the products.

The generation process creates a data structure that is used for finding the items within a bounding box. The data structure is a type of two dimensionally sorted tree. The whole tree for a catalog would be quite large and would take too long to load into a client. It would also take a large amount of memory. To address the performance problems, the tree is partitioned and the client loads only the portions of the tree that it needs. The client always loads the top portion (the n levels closest to the root) of the tree. The top portion is used to locate the correct lower portion (the m levels closest to the leaves) for a given bounding box.

Figure 11:
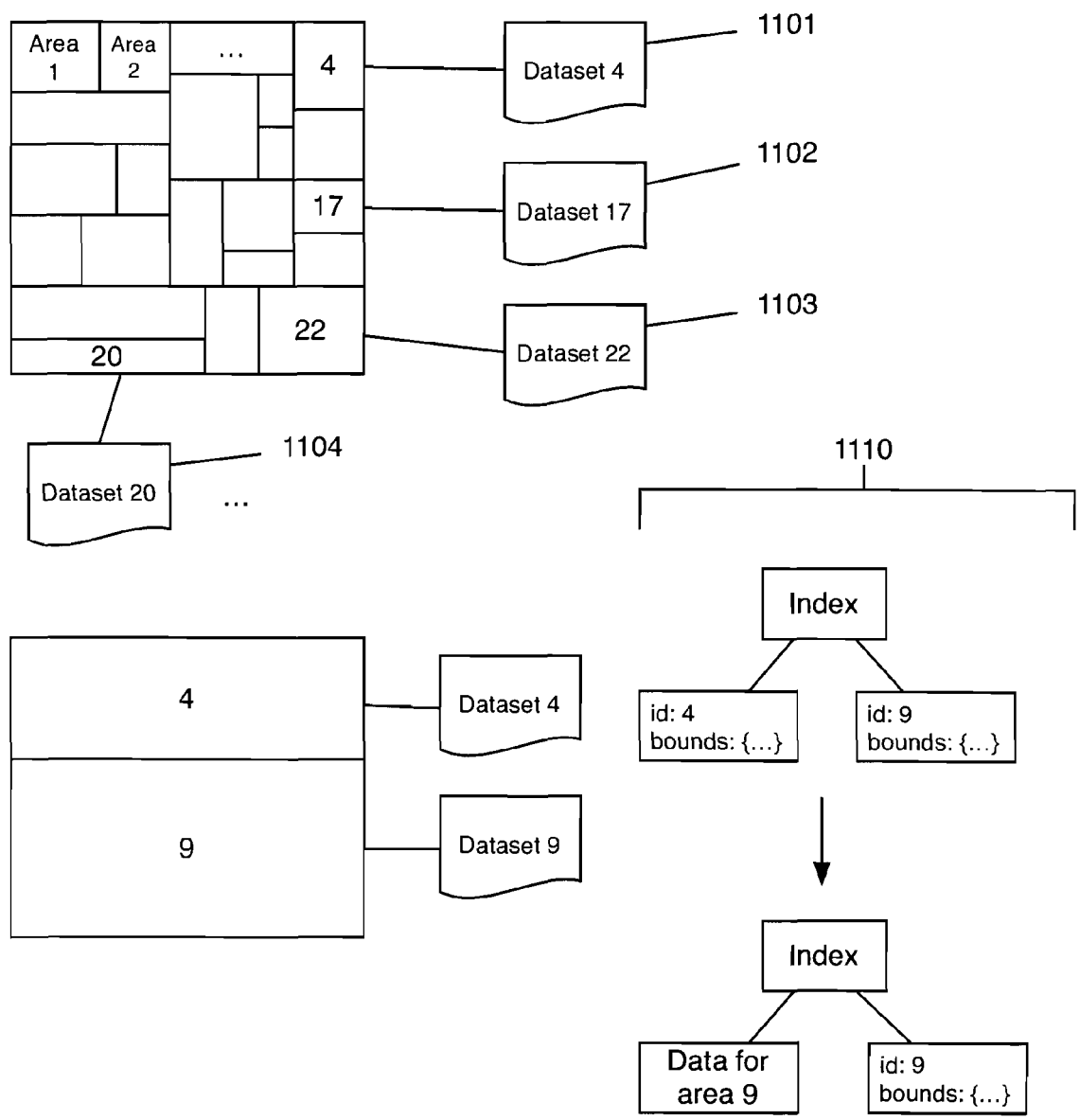
FIG. 11 is a diagram illustrating the area-specific data as used in an embodiment of the present invention.

FIG. 11 illustrates the spatial partitioning of a rectangle into a set of non-overlapping rectangles whose contents are stored as separate datasets. As illustrated, the spatial data is partitioned by region using an algorithm that balances the size of data files such as 1101, 1102, 1103 and 1104. A spatial index file 1110 maps each position to the id of the data file that describes the area that includes that position. When a client needs information about a position on the display level, it requests the dataset that includes that position.

The specific datasets are as follows:
  An item position trunk dataset. This is a machine-readable representation of an O-BSP tree (defined below). The leaves of the tree are integers that index the position branch datasets:

A set of item position branch datasets (the lower portions of the complete tree). Each position branch dataset contains a structure composed of an O-BSP tree, and an array. The leaves of the O-BSP tree are sets of indices into the array. The array contains entries for each item that overlaps the bounding box of the leaf object. Each entry is composed of a bounding box for the item and metadata about the item.

While each category will have the equivalent position and extent at all levels, categories are not displayed in the same way at every level. At a given level some categories will not be large enough to fit a label or an icon. Since the display of the categories is dependent on the level, some of the information about the categories is thus level dependent.

In the preferred embodiment, level-specific data consists of the level's scale factor, and the position and extent of the category icons and category labels. For each level, an object indexed by the catalog id and the level index is stored in the dataset repository. The object is an array of structures. Each structure contains information about a single category and contains the following fields:
the category's id
the bounding box of its icon
the bounding box of its label
Thus, the level specific data is retrieved as necessary as the client displays a specific level.

An Orthogonal Binary Space Partitioning Tree (O-BSP Tree) is a data structure that is used to efficiently retrieve a set of objects that intersect a given spatial position. It is a refinement of a Binary Space Partitioning Tree (BSP Tree), which is well known in the field of computer graphics, and is similar to a kd-tree, which is also well known. It differs from the BSP Tree in that all partitions are by lines that are parallel to one of the coordinate axes. This restriction simplifies the construction and lookup operations on the tree. It differs from a kd-tree in that, like a BSP Tree and unlike a kd-tree, all objects are stored at the leaves of the tree, rather than on interior nodes.

The algorithm for constructing an O-BSP Tree first finds a horizontal (vertical) line that divides the set of object into two sets: those that lie above (left of) the line, and those that lie below (right of) the line. These sets may have a non-empty intersection: the line can pass through the middle of an object. If the sets substantially overlap, the algorithm constructs a leaf node, whose content is simply the set of items. Otherwise, whichever of the horizontal or vertical line best discriminated between the items is used: the algorithm constructs a node whose content is the axis of the dividing line (horizontal or vertical), the median value (the y or x coordinate of the line), and two branches. The application of the algorithm recursively applied to both objects in the top (left) set, and in the bottom (right) set.

The algorithm for retrieving the set of items that intersect a point sets the current node to the root of the O-BSP tree. As long as the current node is not a leaf node, it compares the y (or x) value of the input point to the median value of the current node, depending upon whether the axis of the current node is horizontal or vertical. If the input ordinate is less (greater) than the median value, the current node is set to the first (second) branch, and the algorithm is repeated. The current node will eventually be a leaf node, and a linear search is used to collect the first (or all) object(s) whose bounding boxes contain the input point.

As noted above, the overall tree is subdivided into a set of trees for performance. The item position datasets and trees are generated using the following algorithm. The tree (the "original tree") generates a forest (a "trunk tree" plus a number of "leaf trees"), also as below.

The original tree is divided into a trunk, and a set of branches. The trunk is stored in the position table of contents files. Each branch is stored in a position section file.

The detailed algorithm is as follows: First, each node is assigned a count. For a leaf node, this is the number of items in its set. For any other node, this is the sum of the counts of its leaves. Second, each node with a count greater than or equal to constant, for example 400, whose children each have a count less than that constant, is removed from the tree, and added to the set of branches. It is assigned a unique index, which is used to replace it in the tree, and is also used to identify the file that it is stored in. After these steps, the original tree will have been mutated into the trunk, and the set that has been collected is the set of branches and their indices.

Image Slicing Process

Figure 7:
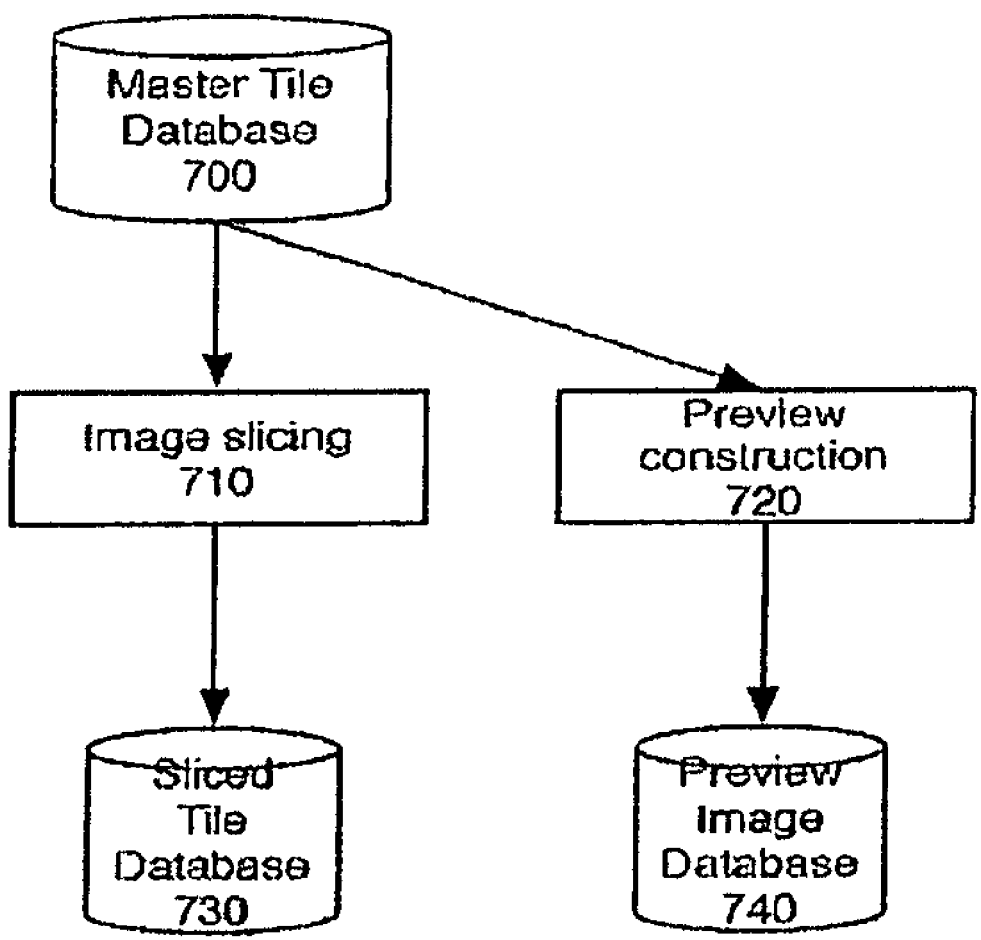
FIG. 7 is a block diagram of the image slicing process of an embodiment of the present invention.

FIG. 7 illustrates the image slicing process. The image slicing process creates a set of "sliced tiles" 730 that span the area represented by the master tiles 700. In the preferred embodiment, the sliced tiles are 256×256 pixels, for a total of four final tiles for each master tile. The image slicing process also creates 720 a set "preview tiles" 740 that represent larger areas at a lower resolution. In the preferred embodiment, these tiles are 1024×1024 pixels, and are compressed JPEG files with a high compression ratio.

Optimized Update Process

As noted, catalog related information changes on a fairly frequent basis as prices change, products are go out of stock and new products are introduced, etc. The catalog update process (above, and in FIG. 3) checks the external catalog sources and updates the item and category databases to contain the latest catalog information. For changes in the catalog to be reflected in the images and data viewed on the client, the entire set of processes could be re-run to create new master tiles and new datasets. The optimized update process (FIG. 8) avoids a complete re-run, by selectively updating portions of this data.

Figure 8:
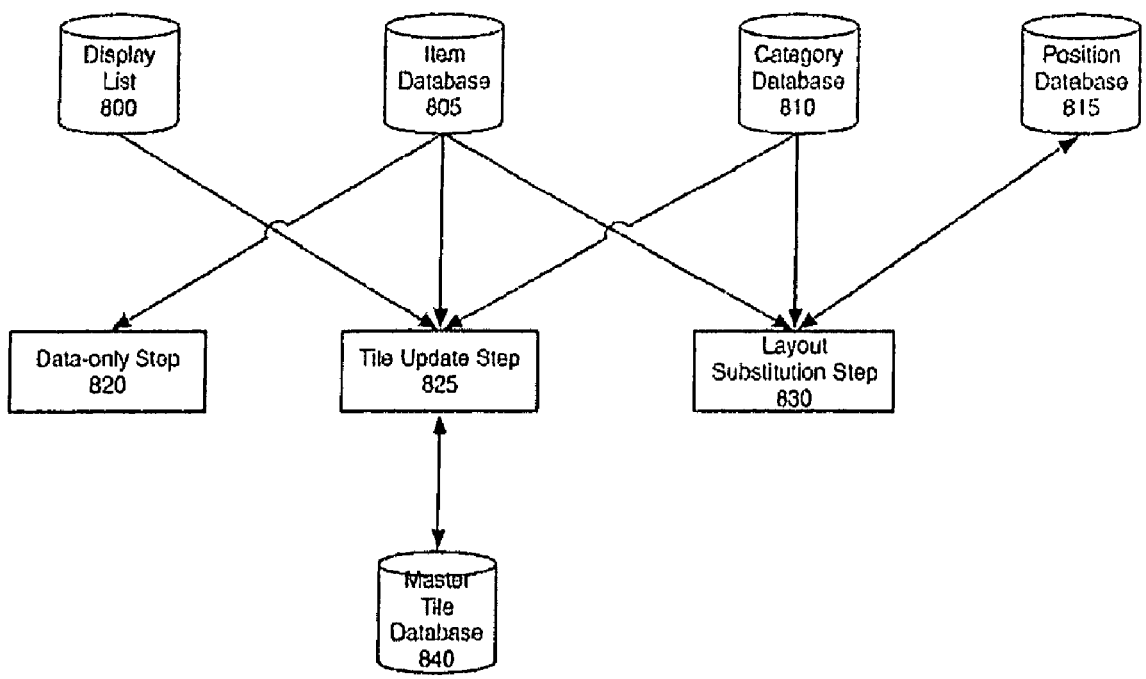
FIG. 8 is a block diagram of the optimized updating process of an embodiment of the present invention.

FIG. 8 illustrates the catalog display update process. It reads the information in the item 805 and category 810 databases, the position database 815, the display list 800, and the master tile database 840, and writes information into the position database 815, and the master tile database 840.

There are three update steps:
The data-only step 820 is done to reflect price changes, product availability, titles and other information that is not incorporated in the images. In this step of the update process only the datasets change.
The tile update step 825 is done to reflect changes in information that is reflected in the tile images, but does not change the layout and positioning of the items or categories. In this step of update a limited number of master tiles 840 are changed.
The layout substitution step 830 is done to reflect changes in products, but where the changes can done by simply replacing some items in the layout with others and not otherwise changing the layout. In this step of update limited portions of the position database 815 are updated.

Since this process is in an optimization to avoid re-running the image creation process, depending upon the catalog data and the configuration of the system, some or all of the update steps may be run. For example, if the prices for a given catalog change very frequently, an optimized update may be run with a data-only update step daily while the image creation process runs weekly.

Data-only updates 820 do not have to make any changes to database tables during in the update process; all of the work is done by the dataset creation process which is re-run to generate new datasets that correspond to the existing layout and tiles, but reflect the new prices and other information.

To accomplish tile updates 825, fields in the item 805 and category 810 databases are classified into either durable data or transitory data. Transitory data is data whose values can change without requiring the execution of the full catalog layout and image creation processes. Transitory data includes such information as the availability of items, their estimated ship date, and deals and special offers that apply to them.

Changes to durable data can only be fully effected by rebuilding the display for the entire catalog. In the preferred embodiment, durable data includes such information as the presence or absence of items in the layout, their categorization, the category hierarchy, and the display regions of items and categories.

The rendering step of the image creation process, described earlier, creates a set of "clean tiles". These images only encode durable data. The tile update step 825 produces tiles that are "stamped" with information that encodes the transitory data.

In order to implement this, the shapes in the display list 800 are labeled with information as to whether they represent transitory or durable information. During the initial rendering process, only durable shapes are rendered. The resulting tiles are called clean tiles. The tile update step 825 reads clean tiles and renders only transitory information onto them. In an alternate embodiment, it can identify tiles that contain transitory information, and re-render these tiles.

The procedure just described adds transitory information to clean tiles to produce tiles with the complete set of shapes. It does not remove tiles that contain out dated transitory rendered in a previous iteration. A separate algorithm is used to identify these out dated tiles.

The algorithm to insure no tiles contain information from a previous state is as follows. The system maintains a list of tiles that have been stamped with transitory data. It initiates an update by creating a new empty list, and adding to the new list indices of tiles as the tiles are stamped. Once all tiles that contain transitory shapes have been stamped, the previous list of stamped tiles is compared with the new list. Any tile that is indexed in the first list and not the second no longer contains transitory information and should be updated. Since there is no transitory information on this tile, the complete tile is the same as the clean tile with the same index. After the old and new lists have been compared, the list of stamped tiles is set to the new list.

If an update runs the tile update step 825, then after the update process completes the dataset creation process and image slicing process must be run. A refinement to this processing sequence is to have the dataset creation and image slicing processes only regenerate the data and tiles for the modified portions of the catalog display.

In a variation of the method just described, the distinction between clean tiles and complete tiles is not present and transitory shapes are not rendered onto tiles on the server. Instead, a description of the locations of these shapes and of the data in these shapes, either as a single overlay image, with translucence, that composites all shapes in a tile's boundary, or a separate image documents that represent separate shapes, or as a vector description of the shapes, is sent to the client along with each tile, and the client displays the representations of these shapes as overlays upon the tile.

The layout substitution update step 830 can be used, for example, to display an "On Sale", "Special Deals" or "Popular Items" section of an online catalog. These sections contain special items that can change on an hourly or daily basis. This is within a catalog display that may only change on a weekly or monthly basis (and may take several days to render in its entirety). When the catalog is updated and the set of items that belong each of these sections changes, the special items that were originally placed in the sections are replaced by the new set of special items e.g. today's hiking boots on special replace yesterday's. The new special items take the positions of the old ones and the master tiles and datasets covering the changed regions are regenerated.

The initial layout algorithm can reserve space for special items that are updated more frequently than the rest of the catalog display and arranges to place highly transitory products in these areas. The initial layout can be accomplished within the existing catalog layout process by treating each group of special items as if they were a separate brand, for example, the popular items are treated as one brand and the on sale items as another brand. These special brands will be treated like other brands by the item comparison process thus causing the special items to be kept together by the layout algorithm. For example, if when the initial layout is generated the goal is to leave room for ten items on sale in the hiking boots category, then ten items are added to this category with the special brand of "on sale".

When the catalog is updated, the products or product attributes can change and the special sections must be updated. Each category is updated in turn and for each category each special section is updated individually. There are four parts to the procedure for updating a special section of a category. First the old set of items is identified, then a new set of items is identified, then a mapping is made between the items in the old set and items in the new set, and finally the new items are substituted for the old items.

For each special section, the previously positioned items of this type are identified. This is done using a field in the position database 815. For example, the hiking boots that were on sale are identified by searching for items in the position database 815 for the hiking boots category and with a special field value of "on sale". In addition, the new items for the special section are identified. For example, the new set of hiking boots that are on sale is identified by checking the item database 815 for products with a significant price reduction.

The number of new items in the special section may be larger than the number of slots for items of this type in this category e.g. there may be twelve hiking boots on sale, but the layout may only have room for ten. In that case, a selection is made from the new items so that the number matches the number of slots in the layout. To match up the numbers, if there are fewer new items than items in the layout, a special empty item is used. Once the number of new items matches the number of old items, a mapping can be made between the new items and the old items. In the current embodiment, both the new and old items are treated as sets and no particular ordering is placed on the items. In an alternative embodiment, the items can be ordered by a set of criteria including using the item similarity database to position the most similar items in this set next to each other.

The mapping between new items and old items is used to substitute the new items for the old items. Each new item is stored into the position database 815 with the coordinates of the corresponding old item. The old item is then deleted from the position database 815.

If an update runs the layout substitution step 830, then after the update process completes, the image creation process is run to regenerate the display list and the master tiles followed by the image slicing process. The dataset creation process must also be run to update the datasets. A refinement to this processing sequence is to record the portions of the overall catalog display that have been modified by these substitutions and use this information to limit the scope of the rendering step of the image creation process and the dataset creation process. The modified portions may represent only a small part of the overall display. Similarly the image slicing process would only have to re-slice the modified master tiles.

Client Functionality

FIG. 1 illustrates the client. The client is a web browser 105. The client requests content from the server 120 and presents it to the user. The content is used to be display a catalog to the user. The content provides both images and non-image data. The data enables the user to click on the image of a product in the catalog and get more information about the product. The user can zoom in and out on the catalog display to see the products in more detail and to see different sections of the catalog. The catalog is displayed using a grid of images called "tiles". In the context of the client, the term tile is somewhat different than the usage with respect to the servers above. In the client context, a tile is an HTML element used to display an image tile as created on the server. The web browser runs Javascript programs that manage user gestures and interactions and update the display based on the gestures. Some of the gestures cause requests to the server for additional content.

When the web browser requests content from the server, the requests are made using the HTTP protocol. The Apache web server running on the server 120 responds to the client's requests. The responses are standard HTTP responses and they contain data in the form of Javascript program files, image files in JPEG or PNG format, HTML files and data files in XML or plain text format.

The images and data sets that the server 120 sends to the client 105 are those created by the server processes described above or static files such as icons. In particular, as illustrated in FIG. 2, the dataset creation process 260 generates datasets 235 that are sent by the web server 280 as responses to requests for data, and the image slicing process 250 generates the sliced tiles 255 that are sent by the image server 270 as responses to requests for images.

An example of the client interactions is as follows. The web browser sends an HTTP request containing the catalog id and optionally a product id to a web server. The server does a query to find the data for the named catalog and if a product id was provided to find the location of the specified product. The response to this request is a web page that includes tags to load libraries of Javascript code and makes a Javascript call to construct the HTML elements and Javascript objects used to load the catalog data and to display the catalog. If a product id was provided the web page also includes Javascript code to position the display so that the catalog portion that is displayed is centered on the location of the specified product.

A Javascript program runs on the browser and requests from the server the tiles for the specified catalog at the initial zoom level. As described in detail below, the only tiles that are requested are the ones that are visible in the browser window. The tiles are displayed in the correct location in the browser window. This is also described below in more detail. The catalog data associated with the current bounding box and zoom level is also requested from the server.

The client creates the impression for the user of zooming in and out and panning around a two dimensional display of a catalog. The product images that are displayed can be clicked on and when they are clicked on additional information about the product is displayed.

The catalog can be displayed at each of a small set of scales called levels. When the user does a specific gesture via the mouse or the keyboard, the display of the catalog appears to zoom in. The zoom is accomplished by the client switching from the display for one level to the display for a higher zoom level. When the display of the catalog is very large, the client is only able to show a portion of the catalog at any one time. The user can see other parts of the catalog by panning to the left, right, top, bottom or some combination. While the display of the catalog at a given level appears to be one very large image, as is described in detail below, the display is actually loaded into the client in pieces called tiles.

While conceptually the catalog display for a given level of zoom is one large image the browser loads this image in many separate pieces called tiles. Each tile is a square image of 128×128 pixels and they have been designed so that a complete set of tiles covers the entire extent of the catalog display image. Each tile has a specific location within the overall catalog display image. When the tiles are placed at their specified location, they are edge to edge in a grid pattern and together they display the whole catalog.

Dynamic HTML (DHTML) is used to display the catalog display within the browser. Three HTML element types are the key to displaying the catalog:
 a container DIV
 a viewport DIV
 a set of IMG elements for tiles
FIG. 16. illustrates an example of these three element types as used in a catalog display.

A single DIV element is used as the container 1610 that holds the viewport 1600. The container 1610 is sized to fit in the whole browser window and is a child of the body of the document. In alternative embodiments it could be sized smaller to leave room for other information or so that a catalog display could be included in another web page. The container style is set to have any overflow hidden from view. This allows child elements of the container to be larger than the container or to extend beyond the boundaries of the container.

The viewport DIV 1600 is a child of the container DIV 1610 and it is absolutely positioned within the coordinate system of the container DIV 1600. If the catalog image displayed in the viewport 1600 is larger than the container 1610, then the container only exposes portions of the image. The clipping is achieved by setting the container's DHTML style for overflow to hidden. The positioning of the viewport 1600 within the container can be adjusted so that different portions of the catalog display image are within the bounds of container.

Figure 16:
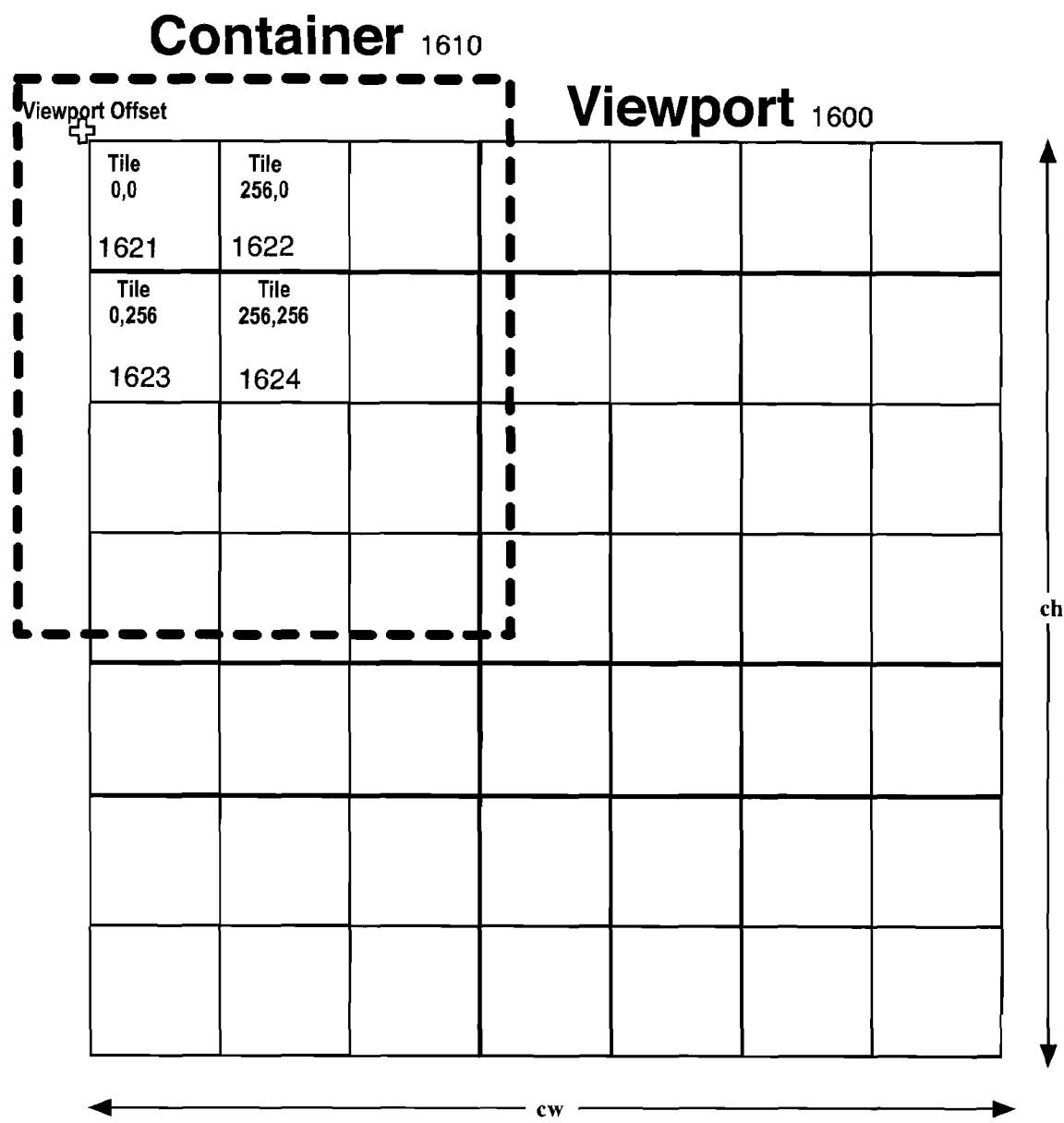
FIG. 16 is an illustration of an example view structure showing a container and a viewport.

The tile IMG elements (1621-1624 represent a few tiles) are all children of the viewport DIV 1600. These images are positioned absolutely within the viewport 1600 by their top left and are arranged in a grid with each image abutting adjacent images. FIG. 16 illustrates that if the overall catalog display image has an extent from 0, 0 to cw, ch, then the tiles location are at x.y where:
 x=i tileSize and 0<=x<cw and i is an integer
 y=j tileSize and 0<=y<ch and j is an integer
When the container is smaller than the catalog display image, the tiles that display those portions of the catalog display image that are clipped by the container are not visible and are not necessary for the display. These non-displayed tiles are not created and added to the viewport DIV 1600. This decreases the number of tiles that must be created and tile images that must be loaded. As the viewport offset is adjusted different portions of the catalog display image are exposed and different sets of tiles become visible. Each time the viewport is shifted new tiles may need to be created.

The algorithm that ensures that all of the necessary tiles exist iterates over all tile positions that are visible. It first translates the bounds of the container into the coordinate system of the viewport by applying the viewport offset. Then it loops over the bounds in both x and y starting with the translated upper left of the container adjusted to be on the nearest tile boundary that is to left and higher. The x and y increment in the loop is the tile size and the iterations stop when the x and y positions are beyond the translated lower right of the container. At each position it checks if there is a tile that is a child of the viewport. If not, it adds this location to a new locations queue.

After all of the new locations are identified and in the new locations queue, the queue is sorted by the distance of the tile location from the center of the container. The tiles that are closest to the center are moved to the front of the queue and those farthest away are moved to end of the queue. This is done for visual purposes, and is not a requirement.

Next the missing tiles are created by mapping over the locations in the new locations queue. The x, y of the location is used to position the tile by setting the tile's absolute position with respect to the viewport. The x, y location is also used to specify the URL that is the SRC of the tile image. The URL for the tiles includes the x, and y offset and the display level index as well as the catalog identifier. The tile is created using the createElement method on the document and then added to the viewport using the appendChild method on the viewport DIV.

Web browsers typically make only a limited number of simultaneous requests. For most common browsers the number is reported to be between two and four. Since a separate request must be made to load of the image for each tile, only a limited number of tiles can simultaneously be loaded. If more tiles than that need to be loaded the rest will have to wait for one of the first batch to complete. Ordering the creation of the tiles from the center outward helps the tiles images get loaded from the center outward. This improves the perceived responsiveness of the display process.

It is not necessary to keep tiles that become invisible when the viewport is shifted and a different region of tiles is visible. The invisible tiles can be removed from the viewport using the removeChild method on the viewport DIV. Removing tiles keeps the browser from having to manage many document elements. The same process that identifies coordinates of tiles that are missing can also select the tiles that are no longer visible and can be removed.

As an optimization, tiles (the HTML elements) that are no longer visible can be reused in another tile location instead of being removed. For example, if the viewport shifts to the right and the tile at 0, 0 is no longer visible and a new tile location at 1024, 0 now is visible, the tile that was at location 0, 0 can be reused at 1024, 0. To reuse the tile its absolute position must be changed and the image's SRC must be set to the URL for the new location. Reusing tiles saves the browser from having to allocate new objects, garbage collect old objects and manipulate the nodes of the Document Object Model (DOM). By using such optimization, a typical shift of the viewport will not have to allocate any new tiles.

Since actual tile images are displayed in the browsing users standard HTML image elements and the images are loaded by the browser, the browser will attempt to cache these images and reuse the image without loading it from the server if they are redisplayed at a later time. The server sets the HTTP headers in the response to a request for an image to encourage the browser to cache the tile images. The Expires header is used and the image is set to expire in one day (or never). If the catalog display is modified then the catalog id will change and since this is part of the tile image URL, the old tiles image will not be reused.

For tiles that are not within the extent of the catalog display the client sets the tile URL to a special URL for empty tiles. The extent is available from the layout object.

When the client first starts up, loading all of the images, code and data can be slow. Instead of the display being empty while all of the content is loaded and prepared, when the client starts up, it first request a "standby image", and displays it in the location in the browser window where the catalog will be displayed. The standby image can be a low-quality representation of the master tile at offset (0, 0). The standby image is created by the server's rendering process. As the actual tiles are loaded, they are displayed in front of the standby image. In alternative embodiments the standby image could contain marketing information or help text.

Figure 20:
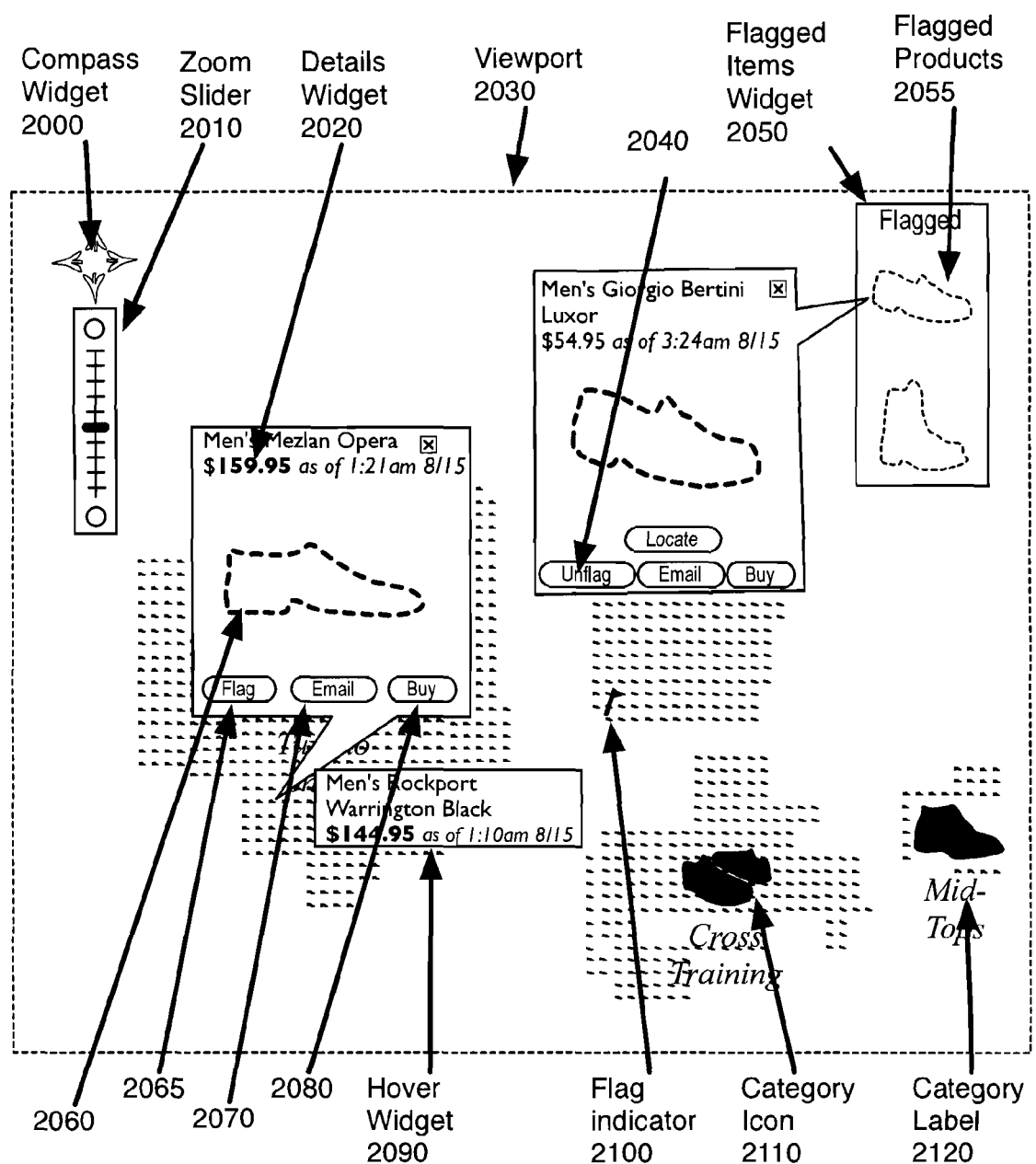
FIG. 20 is an illustration of the user interface controls in an embodiment of the present invention.

As illustrated in FIG. 20, besides the DHTML elements used to display the tiles there are several elements that are displayed in the browser window that either allow the user to control the display or show more information about products. These elements are called widgets and some pan as the catalog is panned and some are in a fixed location on the window.

There are three widgets that are children of the container DIV:

Zoom slider widget 2010

Compass widget 2000

Flagged items widget 2050

These elements do not shift when the catalog display is panned. They are in a fixed location with respect to one or more of the container's edges. These items are all always visible although their display does change.

There are also three user interface elements that are children of the viewport DIV, the details widget 2020, the hover widget 2090 and the flag indicator widget 2100. They all move when the viewport moves. This gives them the appearance of being in a fixed location with respect to a product or category. These items are only become visible based on user gestures.

The details widget 2020 shows detailed information about a product such as the price, title, availability, colors and sizes. The widget is displayed when a user clicks on a location in the catalog display of a product. This widget is positioned so that its "arrow" is on top of the location in the catalog display that is showing the product in question. The widget also will display a rotating selection from the set of images 2060 of the product. This same widget is used to display information about a category. Some of the information that is displayed may be requested from the server.

The hover widget 2030 is displayed when the user hovers his/her mouse over the location of a product in the catalog display. This widget shows a limited amount of information about the product such as the product title and price.

The slider widget 2010 has four components: a scale, a handle, a plus icon, and a minus icon. The purpose of the slider widget is to allow the user to adjust the zoom level of the display using the mouse.

The compass widget 2000 is made up of the four icons. The icons are arrows in each of the four directions of a compass. The purpose of the compass is to allow the user to pan the catalog display by clicking on an icon.

The flagged items widget 2050 is a DIV that has as children the images of all of the flagged products 2055. Flagging is a way for the user to set aside products to further examine and to compare to other products. The process of flagging is described in more detail below.

Javascript programs on the client support a set of user interactions that are invoked by gestures with the mouse or keyboard. The interactions change the display and may cause requests to be made to the server for additional content. The interactions include pan, zoom, resizing the window, moving the mouse over a product or category, clicking on a product or category, flagging a product, sending email about a product, buying a product and searching for matching items. The mechanism and gestures for each interaction are described below.

The user can pan the catalog display by pressing an arrow key on the keyboard or clicking on one of the arrows of the compass widget. The user can also cause the display to be panned by clicking on the "Locate product" link in the details or indirectly by requesting the display of the details widget that may recenter the display to get the details widget completely visible in the container.

Figure 17:
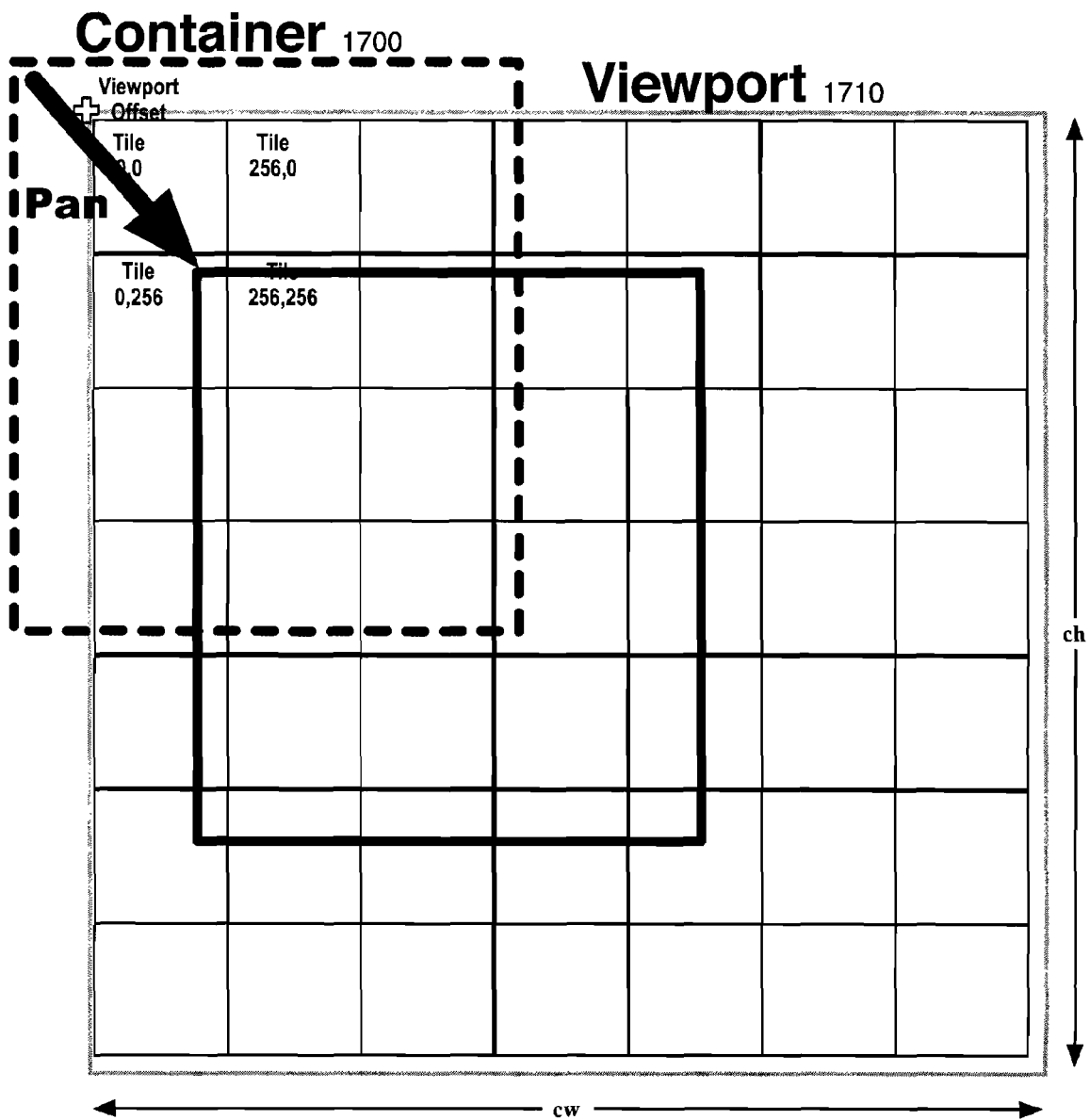
FIG. 17 is an illustration of an example view structure showing a container and a viewport during a pan.

With reference to FIG. 17, panning is accomplished by changing the left and top coordinates in the viewport's style. A pan changes the offset of the viewport with respect to the container. After the viewport 1710 is shifted tiles may have to be added or re-initialized. As illustrated, before the pan, the offset was positive in both x, y and now is negative. The tile creation and updating algorithm is then run to update the tiles.

Pans that move the viewport 1710 by less than the width or height of the container 1700 are animated in such a way to make the pan appear to the user as a smooth shift of the catalog display. The total distance of the pan is broken up into ten steps. Each step is done and then there is a slight delay before the next step is taken.

Clicking the mouse down and dragging initiates a different style of pan. This pan continues to recenter the display until the mouse button is released. The display is re-centered in direct proportion to the amount and direction of the mouse motion so that the perceived effect is that the user has grabbed the category display and is moving it around with the mouse.

If when the mouse button is released the mouse has not moved more than 5 pixels since the start of the drag, then this gesture is interpreted as a click. Since the click gesture is not intended to also do a pan, the viewport is not shifted until the mouse has moved more than 5 pixels.

The drag pan algorithm is broken down into two cases. One case is faster, but is not as general. The other case is general and slower. As the mouse is moved, a delta-x and delta-y are used to track the offset from the mouse location at the start of the drag. The fast case is for when neither the delta-x nor the delta-y is less than the size of a tile. In that case no new area has been exposed that isn't already covered by a tile and there is no need to load new tiles. The pan can simply adjust the offset of the viewport by setting the position in the style.

Once the delta-x or delta-y are large enough, then new area is exposed that is not covered by an existing tile and we must check to see what tiles we need to load and start these tiles loading. After the viewport is shifted, the tile creation and updating algorithm handles any tile adjustments. Once that work is done the delta-x and delta-y are reset to zero, so the system can revert to using the fast case and the slow case doesn't occur again until the user moves by another tile size.

The panning code does not allow the user to move the viewport such that the left edge of the catalog display is to the right of the center of the container as an optimization to keep some portion of the catalog display visible. Similarly it restricts the top edge of the display to not being below the center. The right edge of the catalog display must not move further to the left than the center of the container and the bottom edge of the display must not move further up than the center of the container. The bounds of the catalog display are determined from the layout object.

The user can initiate a change in zoom either by pressing + or − keys on the keyboard, clicking on the + or − icons on the zoom slider widget or by sliding the handle of the zoom slider widget. Changing the zoom sets state in the client. The tile creation and updating algorithm is then run, but all of the tiles are marked for reuse so that they get reloaded with the image for the correct zoom level.

Zooming scales the coordinate system of the catalog display. To keep the viewport centered on the same point in the catalog display, as part of zooming, the viewport 1710 must be shifted.

When the scale factor changes, the client may also request a low-quality representation of the portion of the viewport that will be occupied by the new display level, to display while the tiles that represent the display level at its natural resolution are loaded. One method for generating these standby images is to create a set of low-quality tiles of each display level, with a larger tiling dimension. Another is to use the images from one display level as the standby images for a display level with a lower scale factor.

The container's 1700 size is set to fit the browser window. When the browser window is resized an event handler is invoked for the resize event. The handler adjusts the container's size so that it still fits the window. This may cause it to grow or shrink. After the container is adjusted the tiles are checked. Changing the size of the container may make some tiles invisible and other tiles visible. The tile creation and reuse algorithm is used to identify tiles that need creating and loading, tiles that should be reused and tiles that should be removed.

With reference to FIG. 20, when the user moves the mouse cursor over the selection region of a display object in the viewport 2030, a "hover widget" 2090 that displays additional information about the object is displayed. When the user moves the mouse cursor outside the selection region of this object, the hover widget is removed.

A global variable currentHover stores either the null value, or a reference to a display object. It is initially set to the null value.

When the mouse moves, the mechanism for resolving viewport coordinates to display objects (described below) is applied to the new mouse coordinates to produce a new object, which is either a reference to an item, or null.

If new object is different from that referred to by currentHover, then if currentHover is not null, the hover widget is removed from the display; and in any case, currentHover is set to the new object. If new object is not null, the hover widget is set to display data that describe the new object, and the hover widget is added to the display at a position relative to the position of the new object.

In the preferred embodiment, the hover widget 2090 displays the name and price of an item and the hover widget 2090 can also display information about categories.

When the user clicks the mouse button while the mouse cursor is within a display object's selection region, a "details widget" 2020 is displayed that displays additional information about the object. Products, category icons and category labels are all display objects.

A global variable currentDetails stores either the null value, or a reference to a display object. currentDetails is initially set to the null value. When the mouse is clicked, the algorithm for resolving viewport coordinates to display objects (defined below) is applied to the mouse coordinates to produce a new object, which is either a reference to an object, or null. If new object is different from that referred to by currentDetails, then if currentDetails is not null, the details is removed from the display; and in any case, currentDetails is set to the new object. If new object is not null, the details widget is set to display data that describe the new object, and the details widget is added to the display at a position relative to the position of the new object.

In the preferred embodiment, the details widget 2020 displays the name and price of an item. It additionally displays, in a single position and in a repeating cycle, images of the item; as well as links that perform the actions of "Flagging" 2065 the item, "Buying" 2080 the item, and "Emailing" 2070 the item. This information may require additional requests to the server.

In the preferred embodiment, when the click is on a category icon 2110 or category label 2120, the details widget 2020 displays the name of the category, and the names of its subcategories. It additionally displays, in a single position and in a repeating cycle, images 2060 selected (at dataset construction time) from the images of the items in the category and its subcategories. In order to display this information, it requests the category dataset indexed by the id of the selected category.

The user can mark a set of products with a flag. This mechanism allows the user to visually compare products that are not located in the same area of the catalog display. The details widget 2020 that is shown when the user clicks on a product, has a link 2065 that when selected adds the product into the flagged products. The flagged products are saved in state in the browser and displayed in the flagged items widget 2050.

Flagged products also are visually indicated with a flag 2100 that is displayed as an overlay on top of the product in the catalog display. Each flag is an image element that is added to the viewport 2030. Since this element is a child of the viewport it keeps its location on top of the product when the user pans. When the user zooms, the flags are temporarily removed and then re-positioned to be on top of the same products in their new positions at the new level of zoom.

A flagged product can later be un-flagged which removes it from the set and from the widget. Unflagging also removes the flag indicator. The user is able to request that the viewport 2030 is shifted so that a flagged product becomes visible. This action is available as a link off of a flagged product 2040 in the flagged items widget. Clicking on the "Buy" button 2080 in the details widget causes the browser to switch to a page on Amazon's site for purchasing the product. The URL for the product page incorporates an Amazon Associate ID (see http://affiliate-program.amazon.com) and any purchases will be credited to the matching Associate account. In alternative embodiment, any clicks to purchase would be recorded into a database and the merchant of this product may be charged for the product referral.

Clicking on the "Email" button 2070 in the details widget causes the users mail agent to open a window with a message that describes the item, and that contains a URL that, when opened in a browser, will cause this browser to display the item. This is achieved by encoding the item's persistent id in the URL.

Each item in the item database has a persistent id. This is a unique identifier that guaranteed to remain the same over an extended period of time.

In the preferred embodiment, an item corresponds to a specific product within a specific category. Both pieces of information are necessary in order to uniquely specify an item, since a single product may be placed in more than one category, generating more than one item.

An item id is the reversible function of a product id, and a category id. The function can simply be the concatenation of the string representations of these ids, separated by a character that does not occur in these string representations (if the length of the first representation is variable) or by the empty string (if this length is constant).

When a URL that contains an encoded item id is opened, the client initialization code extracts the id from the URL, and sends a request to the server that encodes this id. The server response specifies the bounding box of the item. When the client receives this response, it modifies the viewport offset to contain these coordinates. The client also displays the detail widget with information about this product. This may also require loading a dataset with relevant product information. The dataset may be loaded asynchronously and the detail widget may be queued to display when such data arrives.

FIG. 18*a* illustrates the search process. When the user 1800*a* initiates a search 1830*a*, the client software 1810*a* encodes the search criteria and the display context 1835, and submits this information 1840*a* to the server 1820*a*. The server decodes the search criteria and the display context 1845*a*, and uses this information to construct a database query 1850*a* against the item 1870*a* and position 1880*a* databases. The server encodes 1855*a* the result of this database query and sends it to the client, which decodes 1860*a* this information and uses it 1865*a* to construct a mask region, which is overlaid onto the catalog level display to make items within the current viewport that do not match the search criteria less visually salient.

The user can initiate a search 1830*a* by entering text into a text field, selecting items from a set of user interface controls, or making use of other well-known data entry interfaces. The client software 1810*a* encodes this information, as well as the following display context information: the catalog display id, the display level index, and the viewport bounds. In the preferred embodiment, the query and context information are encoded as URL query parameters, which the server decodes 1845*a* using a server library function such as the PHP_GET object.

The server queries 1850*a* the databases 1870*a* and 1880*a* for items whose regions overlap the viewport bounds within the item position table 1880*a* selected by the specified catalog display id and display level index, and whose item properties match the search query parameters. It constructs an HTTP response that encodes 1855*a*:

The id and display region of each matching item.
A vector description of the boundary between the regions that items within the viewport that match the search criteria, and items within the viewport that do not.
Mask images that "shrink-wrap" this boundary to the actual images.

The client decodes this response 1860*a*, and uses it to construct a mask that overlays the display level.

Figure 18:
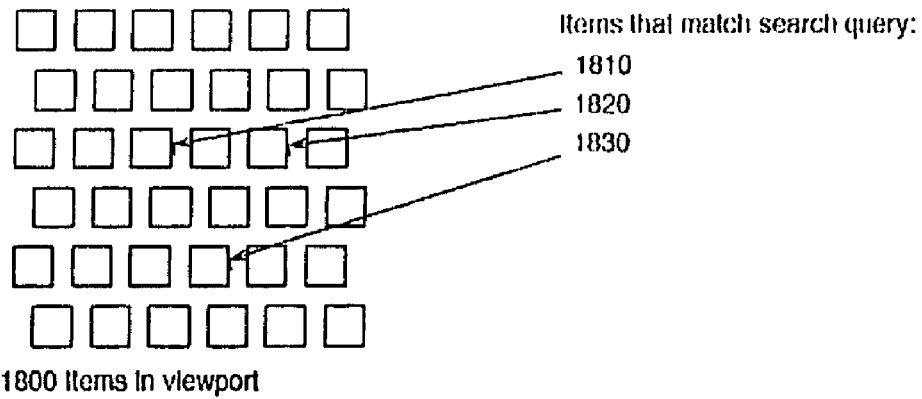
FIG. 18 is an illustration of an example search results highlight mask.
Figure 18:
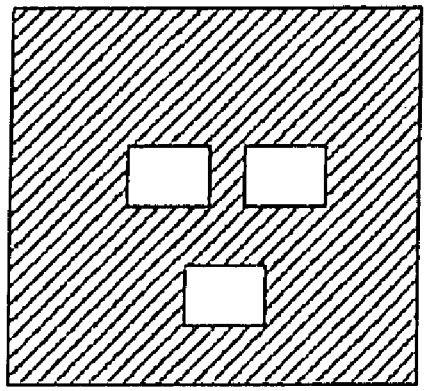
Figure 18:
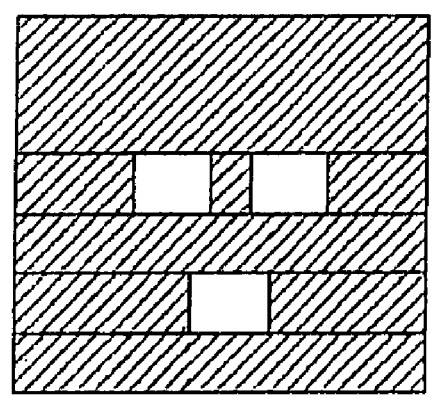
Figure 18:
Figure 18:
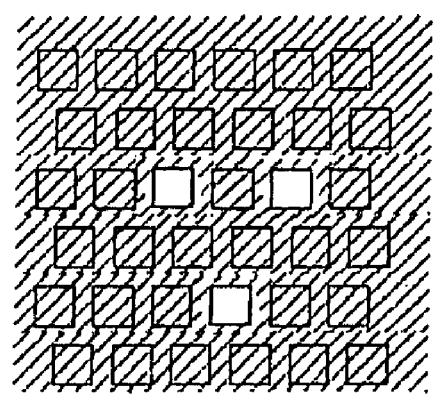

FIG. 18 illustrates the use of the search request result data to construct a mask. 1800 illustrates the spatial position of the items in the current viewport. The squares labeled by 1810-1830 represent items in the viewport that match the search criteria. 1840 displays the mask region: this region covers the entirety of the viewport, minus the display regions of the matching items. 1850 displays a decomposition of the mask region into rectangles. 1860 is a diagram of an image that is placed into each of the holes in 1850 to create a mask with rounded gradient holes, rather than sharp rectangular holes. 1870 is a schematic diagram of the effect of overlaying the mask region composed of the rectangular decomposition in 1850, and copies of the image in 1860, in front of the level display diagramed in 1800.

When the user initiates a search, the search criteria are stored. When the user pans or zooms the display image, the client submits a request to the server with the search criteria, the catalog display id, the new viewport bounds, and (in the case of a zoom) the new display level index. In the case of a pan, the client may request search results for a bounding box that is a proper superset of the viewport bounds, in order to eliminate the need for a new request during small pans.

Other embodiments include the following. A mask image can be generated on the server (instead of the client) and supplied in place of a mask description as part of the response to the search request. The search display may not utilize a mask, but rather highlight the items matching the search using things like a colored overlay, bounding box, blinking field, etc. The results do not have to loaded simply for the viewport. Instead, all results may be supplied at once for the whole catalog or they can be loaded asynchronously and incrementally, with those visible in the viewport being loaded first. Search results may simply show a list of all matching products in a widget (similar to the flagged product widget) and allow the user to interact with them.

There are additional mechanisms used by the client generally when handling user gestures. The algorithm for resolving viewport coordinates to display objects is as follows. The coordinate relative to the viewport is tested against the display regions of categories, category labels and icons, and items. Since all of the data is not loaded at once, this algorithm may result in additional data being requested from the server.

The coordinate is first tested against the label and icon bounds in the level-specific data. If it lies within the label or icon bounds associated with any category record in that data, the category id associated with that category is returned.

Otherwise, the coordinates are scaled by the inverse of the display level scale factor to generate a pair of ground level coordinates. These coordinates are used to traverse the O-BSP tree in the position index using algorithms that are well known in the field. Where this traversal ends at a node whose value is a position subtree index, the subtree dataset with this index is requested. Where this subtree dataset is immediately present on the client (because it was previously requested and its value is cached), the ground level coordinates are used to do a second traversal. The second traversal is of the subtree within the dataset.

Where the second traversal ends at a node whose value is a set of indices, and one of these indices indexes an entry in the subtree dataset's shape list whose bounds include the ground level coordinates, the data in this record is used to create a RAM representation of an item, and a reference to this item is returned.

The mechanism for loading data is as follows. When an event occurs that causes the client to request a set of data, it first constructions a URL to retrieve the data and then initiates an HTTP request for this URL. The URL contains the appropriate indices for the specific data. For example, the category details data is indexed by the catalog id and the category id. The indices for each of the data sets are defined in the section that describes the dataset creation process.

The web server receives the request and decodes the indices, and uses these as keys to select an item from the correct data set. The encoded content of this database entry is returned as the content of an HTTP response. Upon receiving the response, the client decodes its content and stores it in the client RAM, indexed by its data type and type-specific indices. The application of conventional caching mechanisms, including the use of caches prioritized by time and frequency of use, to the storage of these datasets in client RAM, is evident to one familiar with the art.

Data is requested to be loaded by events from user gestures and by initialization of the client application. An event that invokes a request for data does not wait for the data response since that the delay may so long as to prevent timely event processing. The responses are handled asynchronously. The mechanism for loading a data maintains a map from the data type and data set indices to action descriptions. When the client receives the response to a data request, if there is an entry for that matches this data request, it is removed, and the actions in the set are executed.

When the client application begins execution, it requests the catalog display summary data for the catalog id. A client application is initialized with a catalog id. In the preferred embodiment, this id is derived from the URL that the client application was launched from. When the catalog view is set to a new zoom level, the client requests the position index data for the catalog id and the zoom level index.

The description of the embodiments of the invention has been presented for the purposes of illustration and description. It is not intended to limit the invention to the specific embodiments disclosed. One of ordinary skill in the art would understand that modifications and variations are possible in light of the disclosure. It is not intended that the scope of the invention not be limited to detailed description of the embodiments and only be limited by the scope of the claims herein.

What is claimed is:

1. A system for generating a two dimensional catalog display, comprising:
    one or more computers each having one or more processing units, one or more storage units, and one or more network connections, the one or more processing units adapted to operate according to signals received from the one or more storage units and communicate via signals through the one or more network connections, the one or more processing units further adapted to execute a set of instructions stored in the one or more storage units, the set of instructions comprising:
    a catalog storage module for storing a plurality of catalog entries and a plurality of images within the one or more storage units, at least one of the images being associated with at least one of the catalog entries;
    a display generation module configured to communicate with the catalog storage module, retrieve a portion of the plurality of catalog entries and a portion of the plurality of images from the catalog storage module, and generate the two dimensional catalog display representing a layout of the portion of the plurality of images, the images being associated with the portion of the plurality of catalog entries, wherein the size and position of the plurality of images related to the one or more catalog entries in the layout is a synthetic item comparison measure from at least one value associated with the one or more catalog entries and not having a dimensional preference; and
    a display module adapted to communicate at least a portion of the two dimensional catalog display over the one or more network connections, such that the portion of the two dimensional catalog is displayed.

2. The system of claim 1 wherein the display generation module is further adapted to generate the layout of the plurality of entries related to the one or more catalog entries in the two dimensional catalog display, wherein entries of the one or more catalog entries with similar synthetic item comparison measures are located in a proximity proportional to the synthetic item comparison measures, and the display module is further adapted to allow zooming or panning of the catalog display.

3. The system of claim 2 wherein each of the portion of plurality of entries has an associated set of characteristics, and the synthetic item comparison measures are based upon at least a portion of the characteristics.

4. The system of claim 3 wherein the display generation module generates the two dimensional display based upon the synthetic item comparison so that the catalog display has entries with similar synthetic item comparison measures that are placed closer in proximity to one another and without a dimensional preference.

5. The system of claim 4 wherein the display generation module is further adapted to generate a plurality of catalog displays, each of the plurality of catalog displays varying according to a display modifier.

6. The system of claim 5, wherein said catalog displays represent products, and at least a portion of said set of characteristics comprises information descriptive of the products.

7. The system of claim 6, wherein said portion of said set of characteristics contains at least one data item selected from the group consisting of: size, style, product category, color, weight, manufacturer, price, materials, popularity, inventory, location and discount.

8. The system of claim 5, wherein said catalog display further comprises a set of tiles.

9. The system of claim 5, wherein said catalog display further comprises at least one information set related to the catalog entries.

10. The system of claim 9, wherein said information set contains information selected from the group consisting of: size, style, product category, color, weight, manufacturer, price, materials, popularity, inventory, location and discount.

11. The system of claim 5, wherein the display modifier is a zoom factor.

12. The system of claim 5, wherein the display modifier is a pan factor.

13. The system of claim 4, wherein at least a portion of said set of characteristics is received from at least one source separate from said system.

14. The system of claim 3, wherein said display generation module generates said two dimensional display based upon said relationship so that the catalog display has at least a portion of the entries placement related to said relationship.

15. The system of claim 14, wherein said display generation module is further adapted to generate the two dimensional display dynamically.

16. The system of claim 15, wherein said display generation module is adapted to communicate the two dimensional catalog display to said display module as the two dimensional catalog display is generated.

17. The system of claim 14, wherein said display generation module is further adapted to generate the two dimensional non-dynamically.

18. The computer system of claim 17, wherein said display generation module is adapted to communicate at least a portion of the two dimensional display to the display module prior to completing the generation of the two dimensional catalog display.

19. The system of claim 4, wherein said display module further includes a view port, wherein the view port contains only a portion of the two dimensional catalog display.

20. The computer system of claim 1, further comprising a search module adapted to receive a search criteria.

21. The system of claim 20, wherein the display generation module is adapted to retrieve the catalog entries and associated images from the catalog storage module based upon the search criteria.

22. The system of claim 20, wherein the display generation module is adapted to generate the two dimensional catalog display representing a layout of the images associated with each of the entries based upon the search criteria.

23. The system of claim 20, wherein the display module is adapted to highlight one or more portions of the catalog display.

24. The system of claim 1, wherein the display module is adapted to receive transitory information.

25. The system of claim 24, where the display generation module is adapted to highlight one or more portions of the catalog display based upon the transitory information.

26. The system of claim 24, where the display generation module is adapted to overlay textual information on one or more portions of the catalog display based upon the transitory information.

* * * * *